(12) United States Patent
De Azambuja

(10) Patent No.: US 8,166,715 B2
(45) Date of Patent: May 1, 2012

(54) COLLAPSIBLE MODULAR SHELTER FOR CONTAINERIZED TRANSPORTATION

(75) Inventor: James Buchanan De Azambuja, Chorillos (PE)

(73) Assignee: Weatherhaven Resources Ltd., Burnaby, CA (US)

( * ) Notice: Subject to any disclaimer, the term of this patent is extended or adjusted under 35 U.S.C. 154(b) by 0 days.

(21) Appl. No.: 12/088,220

(22) PCT Filed: Sep. 26, 2006

(86) PCT No.: PCT/CA2006/001584
§ 371 (c)(1),
(2), (4) Date: Jul. 28, 2008

(87) PCT Pub. No.: WO2007/033498
PCT Pub. Date: Mar. 29, 2007

(65) Prior Publication Data
US 2009/0217600 A1    Sep. 3, 2009

Related U.S. Application Data

(60) Provisional application No. 60/719,983, filed on Sep. 26, 2005.

(51) Int. Cl.
*E04H 3/00* (2006.01)
(52) U.S. Cl. ......... 52/79.5; 52/79.1; 52/122.1; 52/127.7
(58) Field of Classification Search ............. 52/64, 79.1, 52/79.5, 79.9, 79.13, 122.1, 127.7, 282.3
See application file for complete search history.

(56) References Cited

U.S. PATENT DOCUMENTS

| | | | |
|---|---|---|---|
| 2,167,557 A | 7/1939 | Stout | |
| 2,395,691 A | 2/1946 | Smith | |
| 2,886,856 A | 5/1959 | Che | |
| 3,226,890 A | 1/1966 | Flajole | |
| 3,629,982 A | 12/1971 | Ballay et al. | |
| 4,155,204 A | 5/1979 | Prozinski | |
| 4,212,251 A | 7/1980 | DiMartino | 24/73 R |
| 4,633,626 A * | 1/1987 | Freeman et al. | 52/71 |
| 4,635,412 A | 1/1987 | Le Poittevin | 52/79.5 |

(Continued)

FOREIGN PATENT DOCUMENTS

CN    1131447 A    9/1996

(Continued)

OTHER PUBLICATIONS

International Search Report for PCT/CA2006/001584, International Searching Authority Jan. 15, 2007, pp. 1-4.

*Primary Examiner* — William Gilbert
*Assistant Examiner* — Patrick Maestri
(74) *Attorney, Agent, or Firm* — Seed IP Law Group PLLC

(57) ABSTRACT

A containerized portable shelter which is small and light enough for helicopter transport but which can also travel through container channels and has increased expandability of the floorspace is provided. It has a fraction (e.g. one-half) the standard ISO width, so that a plurality of modular units can be joined to form a standard ISO container. Two or more modular units can be joined side-by-side and/or end-to-end to form a compound shipping container preferably having ISO freight container characteristics.

28 Claims, 33 Drawing Sheets

U.S. PATENT DOCUMENTS

| | | | |
|---|---|---|---|
| 4,689,924 A | 9/1987 | Jurgensen | |
| 4,780,996 A | 11/1988 | Julien, Jr. | |
| 4,854,094 A | 8/1989 | Clark | |
| 5,237,784 A | 8/1993 | Ros | |
| 5,461,832 A | 10/1995 | Smith | |
| 5,493,817 A | 2/1996 | Speer | |
| 5,611,449 A * | 3/1997 | Pedersen | 220/6 |
| 5,761,854 A | 6/1998 | Johnson et al. | |
| 5,966,956 A | 10/1999 | Morris et al. | |
| 6,010,021 A * | 1/2000 | Zuidam et al. | 220/1.5 |
| 6,164,862 A | 12/2000 | Takaguchi | |
| 6,223,479 B1 | 5/2001 | Stöckli | |
| 6,345,471 B1 | 2/2002 | Gyllenhammar | |
| 6,712,414 B2 | 3/2004 | Morrow | |
| 6,772,563 B2 | 8/2004 | Kuhn | |
| 6,792,892 B2 | 9/2004 | Craig | |
| 6,983,567 B2 * | 1/2006 | Ciotti | 52/79.5 |
| 7,056,081 B2 * | 6/2006 | Kelly | 414/792.9 |
| 2002/0116878 A1 | 8/2002 | Ciotti | |
| 2005/0120639 A1 | 6/2005 | Bucher et al. | |

FOREIGN PATENT DOCUMENTS

| | | |
|---|---|---|
| DE | 20 2004 008 090 | 1/2005 |
| EP | 0 077 103 | 10/1982 |
| JP | 8-333088 A | 12/1996 |
| JP | 9-500183 A | 1/1997 |
| JP | 10-291587 A | 11/1998 |
| WO | 2004040073 A1 | 5/2004 |
| WO | 2005/014439 | 2/2005 |

* cited by examiner

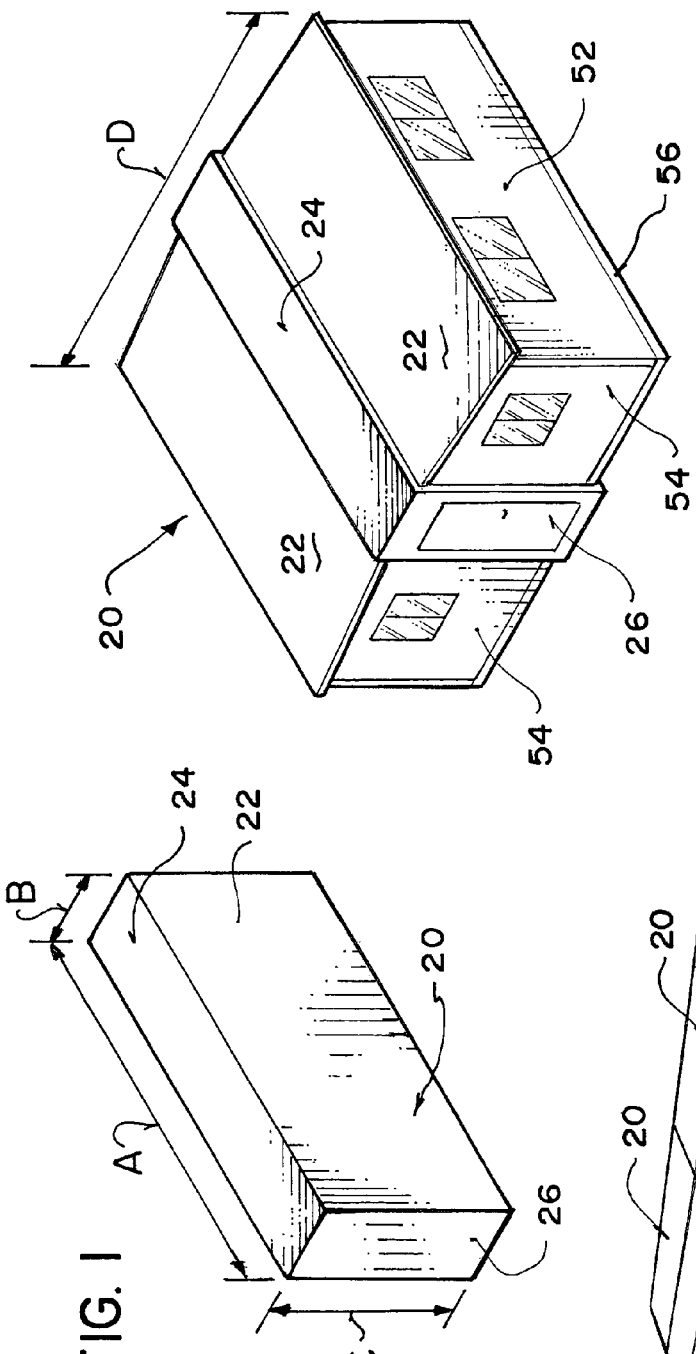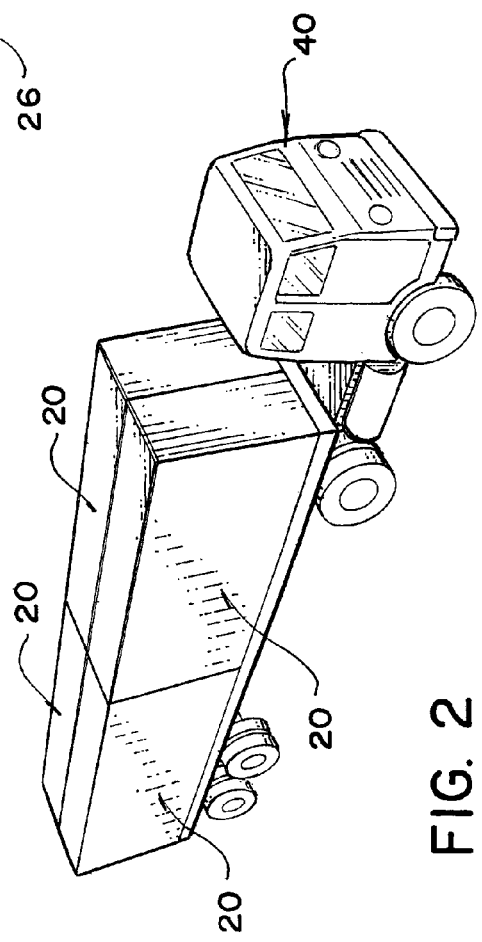

COLLAPSIBLE MODULAR SHELTER FOR CONTAINERIZED TRANSPORTATION

CROSS-REFERENCE TO RELATED APPLICATION

The present application claims priority from U.S. provisional patent application No. 60/719,983 filed Sep. 26, 2005, which is pending.

TECHNICAL FIELD

The invention relates to the field of portable shelters and more particularly collapsible portable shelters which can be transformed into a rigid shipping container for transporting.

BACKGROUND ART

Collapsible portable shelters which can be transported through ISO container shipping channels are useful for military or civilian projects of short duration or projects which are sufficiently remote that on-site construction is uneconomical. The present applicant has developed a collapsible portable containerized shelter sold commercially under the trade-mark MECC ("Mobile Expandable Container Configuration") which is the subject of U.S. Pat. No. 5,761,854 issued Jun. 9, 1998. That patent discloses a portable, collapsible shelter which when collapsed forms a single unitary container having the dimensions and characteristics which satisfy the standards for ISO shipping containers. One or both of the vertical sides of the container pivots between a closed vertical position and an open horizontal position and a flexible fabric cover extends above the pivoting wall portion while the pivoting wall portion is in the lowered horizontal position to form the shelter.

The MECC container can be transported through the usual ISO shipping channels, whether ship, rail or truck. It is stacked or loaded using forklift or crane. Due to the weight of the container however it is difficult to transport the MECC shelter by helicopter. Also the maximum floorspace expandability of the MECC from the container to the expanded shelter is a ratio of 3:1. There is therefore a need for a containerized portable shelter which is small and light enough for helicopter transport but which can also travel through container channels and has increased expandability of the floorspace.

DISCLOSURE OF INVENTION

The present invention provides a portable, collapsible shelter unit which can be combined with one or more additional units to form a rigid compound shipping container, which in the preferred embodiment has the characteristics of a standard ISO shipping container. Connectors are provided to secure adjacent modular units into a single compound shipping container. Various structural systems can be used to expand each modular unit into a shelter. According to one aspect, the two rigid vertical side panels of each modular units may be hinged along one edge thereof to pivot between a closed vertical position and an open horizontal position to form two roof or floor sections. Floor or roof sections may then fold out from the interior and vertical sides fold up from each floor or roof section and vertical ends fold out from the modular unit. A crane may be provided to facilitate raising of the roof sections and sides and lowering the floors and to act as a ladder during the expansion process. According to another aspect of the invention the living space can be expanded using a flexible cover system as disclosed in U.S. Pat. No. 5,761,854 which is incorporated herein by reference.

BRIEF DESCRIPTION OF DRAWINGS

In drawings which illustrate a preferred embodiment of the invention:

FIG. 1 is an isometric view of a modular unit according to the invention in collapsed state ready for shipping;

FIG. 2 is a perspective view of four modular units according to the invention forming a 40' container mounted on a flat bed trailer;

FIG. 3 is an isometric view of a modular unit according to the invention in expanded state;

BEST MODE(S) FOR CARRYING OUT THE INVENTION

With reference to FIG. 1, in its collapsed state, one embodiment of the present invention forms a modular unit 20 which is one-half the width, and the same height and length, and having the same fittings and other characteristics of a shipping container conforming to ISO (International Standards Organization) standards, namely a length A which may be 6.044 m. (20 feet) or 12.08 m. (40 feet), 1.219 m. (4 feet) in width B and 2.9 m. (9.5 feet), 2.43 m. (8 feet) or 2.6 m. (8.5 feet) in height C. The ISO and related standards applicable to the construction of the invention may be found in the following publications:

ISO 1161 Series 1 freight containers—corner fittings—specification

ISO 1496 1: Series 1 freight containers—Specification and testing—Part 1: General cargo containers for general purposes ISO standards 9000 through 9004—quality standards International Union of Railways (U.I.C.)

Transport International des Routiers (T.I.R.)

Convention for Safe Containers (C.S.C.)

Two or four modular units 20 can thus be connected side by side to form a single 20-foot or 40-foot ISO shipping container. While it is preferred that the compound shipping container thus formed has the characteristics which satisfy ISO standards, the invention is also useful to form compound shipping containers which are non-ISO.

Figure 13:
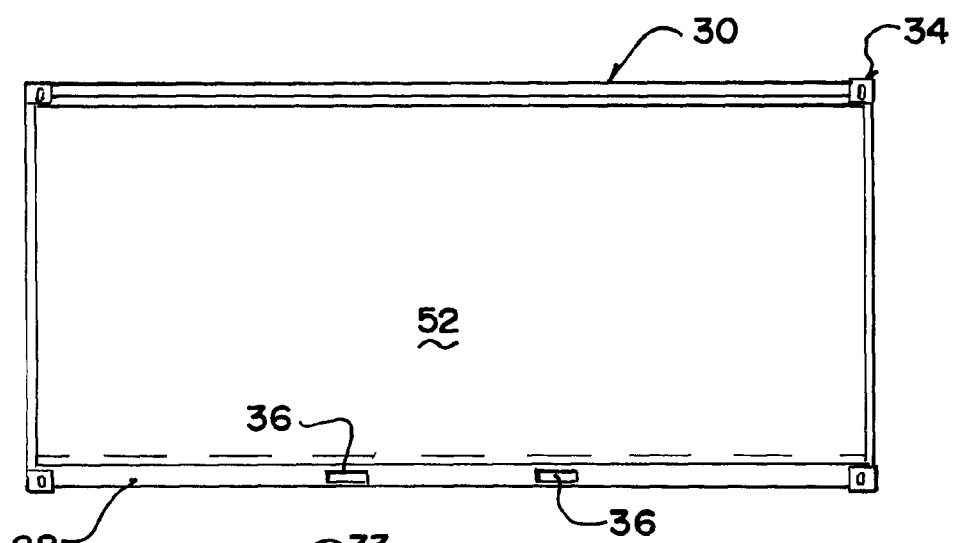
FIG. 13 is a side view of the collapsed modular unit as shown in FIG. 1.
Figure 14:
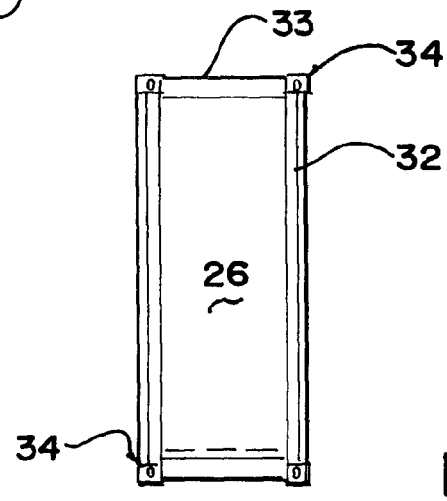
FIG. 14 is an end view of the collapsed modular unit as shown in FIG. 1.

The modular unit 20 has rigid sides 22, roof 24 and ends 26. As shown in FIGS. 13 and 14, metal bottom side rail 28, top side rail 30, metal vertical rails 32, end rails 33, 35 and corner fittings 34 provide reinforcement of the structure during shipping. Pockets 36 are provided to receive the forks of a fork lift vehicle. Plumbing, mechanical and electrical systems can be pre-installed in the floor or walls or elsewhere in the interior of modular unit 20.

FIG. 2 shows four modular units 20 connected to form a 40' ISO container for shipping on a flatbed truck 40 or otherwise through the international ISO container channels. The ISO corner fittings of adjacent modular units are secured to each other by the connectors described in further detail below. Each individual modular unit 20 can be transported by helicopter by connecting cables to the upper corner fittings of a modular unit in the conventional way. Similarly, two modular units 20 feet in length and 4 feet wide can be provided which when connected form a 20' ISO container, two modular units 40 feet in length and 4 feet wide can be provided which when connected form a 40' ISO container, or four modular units 10 feet in length and 4 feet wide can be provided which when connected form a 20' ISO container.

Roof 24 may be a standard container roof of mild steel. Corner fittings 34 are manufactured of cast steel, and other frame members may be of mild steel. Aluminum and other materials will also be suitable. End walls 26 and side walls 22 can be formed of sections of steel panels surrounding rigid insulation foam and end walls 26 may be provided with a door 27 and knock-out panel 27A for glazing. Floor surfaces 42, 44 (FIG. 10) may be plywood with a vinyl or linoleum top layer. Floor and wall insulation may be provided such as rigid polyurethane or polystyrene foam or fibreglass batt insulation may be used.

Figure 4A:
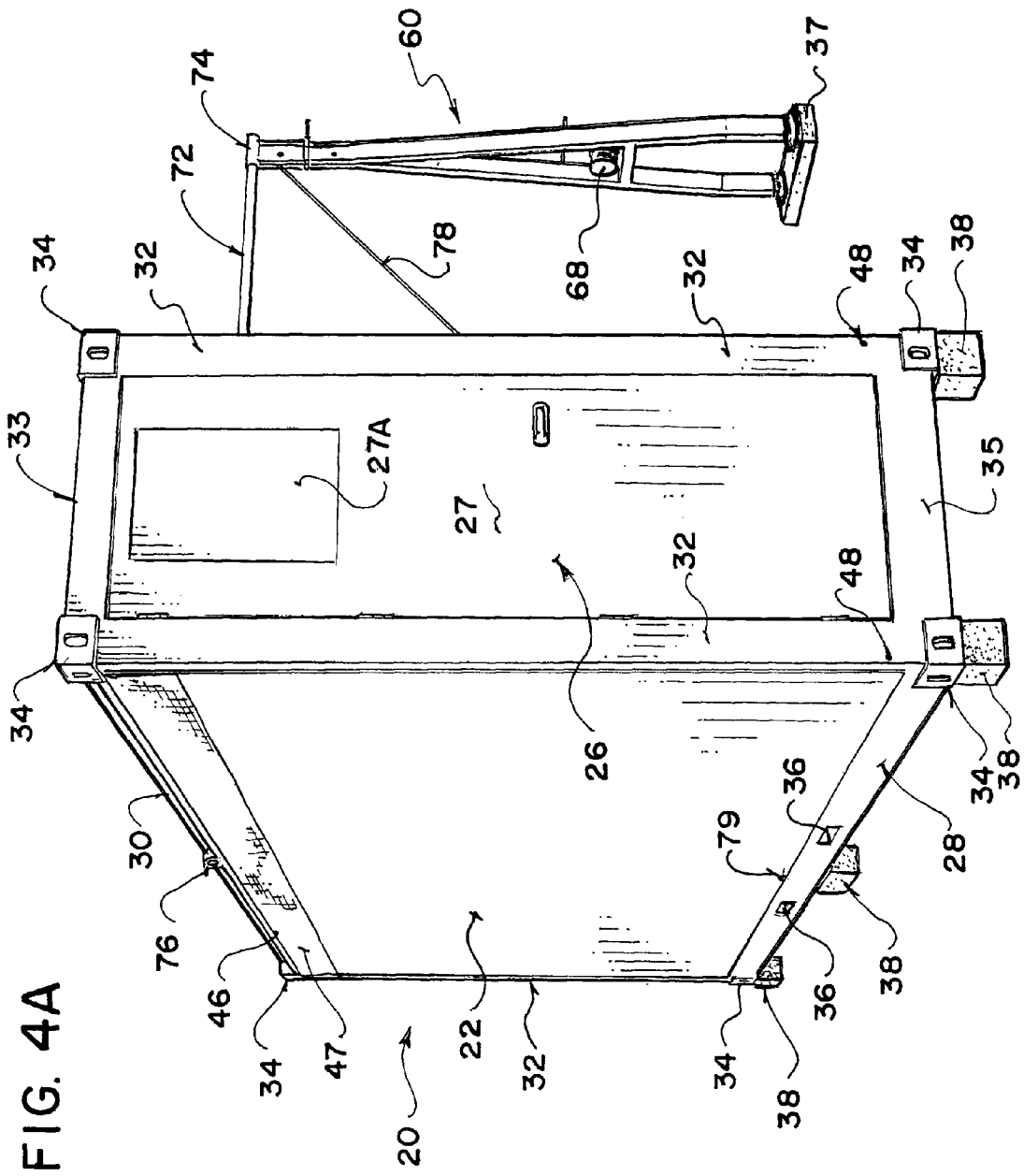
FIG. 4A is a perspective view of a modular unit according to the invention in collapsed state.
Figure 4B:
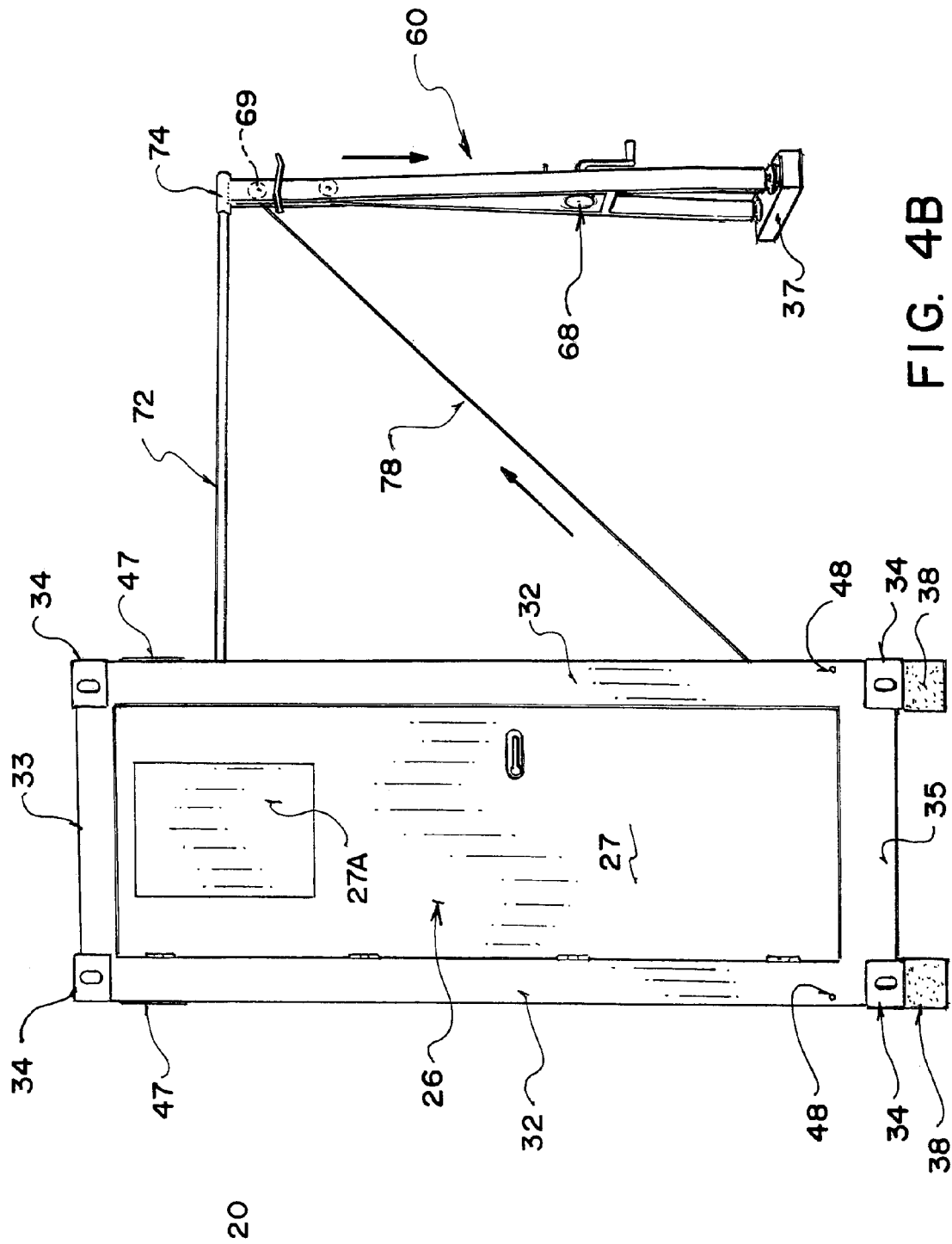
FIG. 4B is a front view of the modular unit shown in FIG. 4A with crane attached.
Figure 4C:
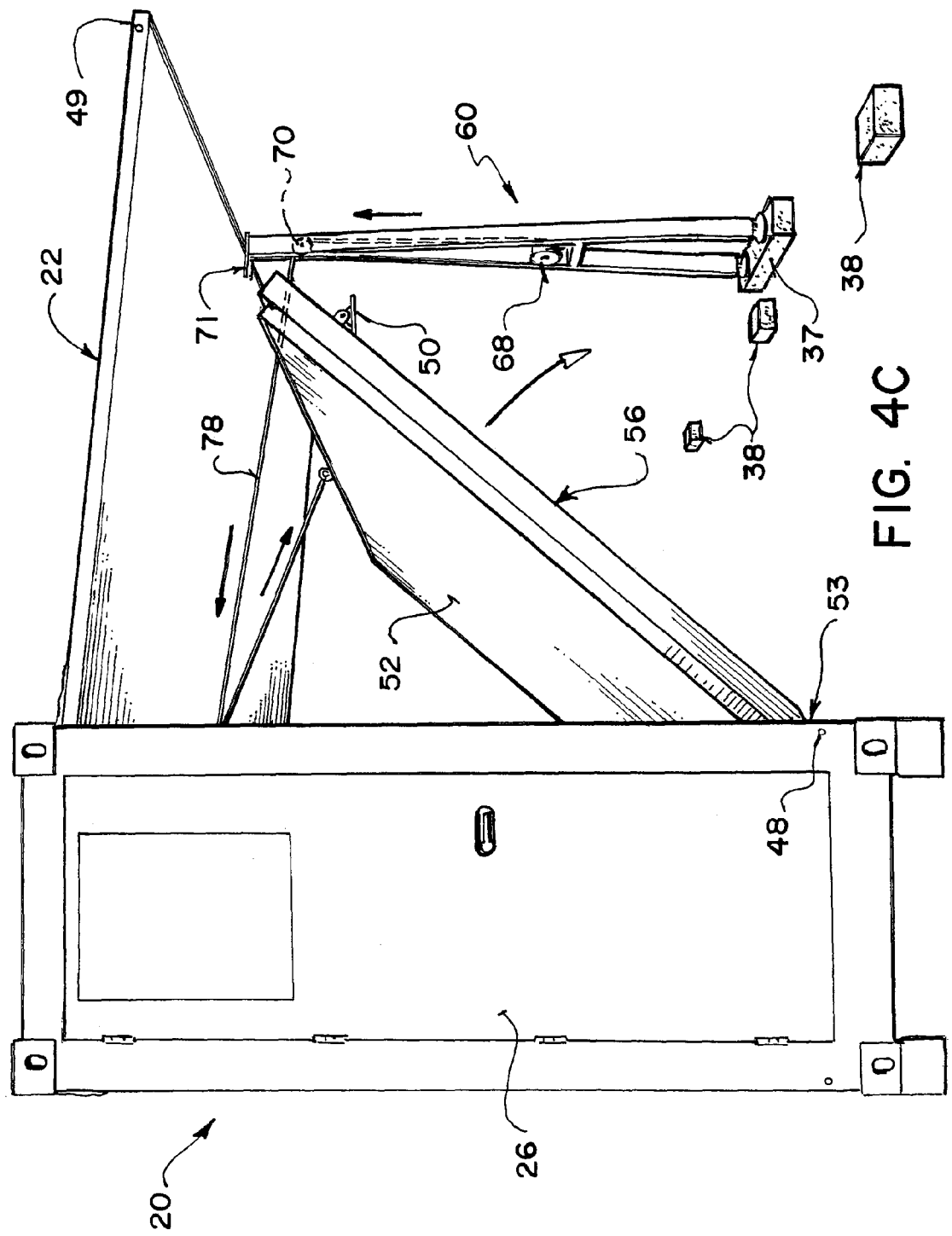
FIG. 4C is a front view of the modular unit shown in FIG. 4A partially expanded.
Figure 4D:
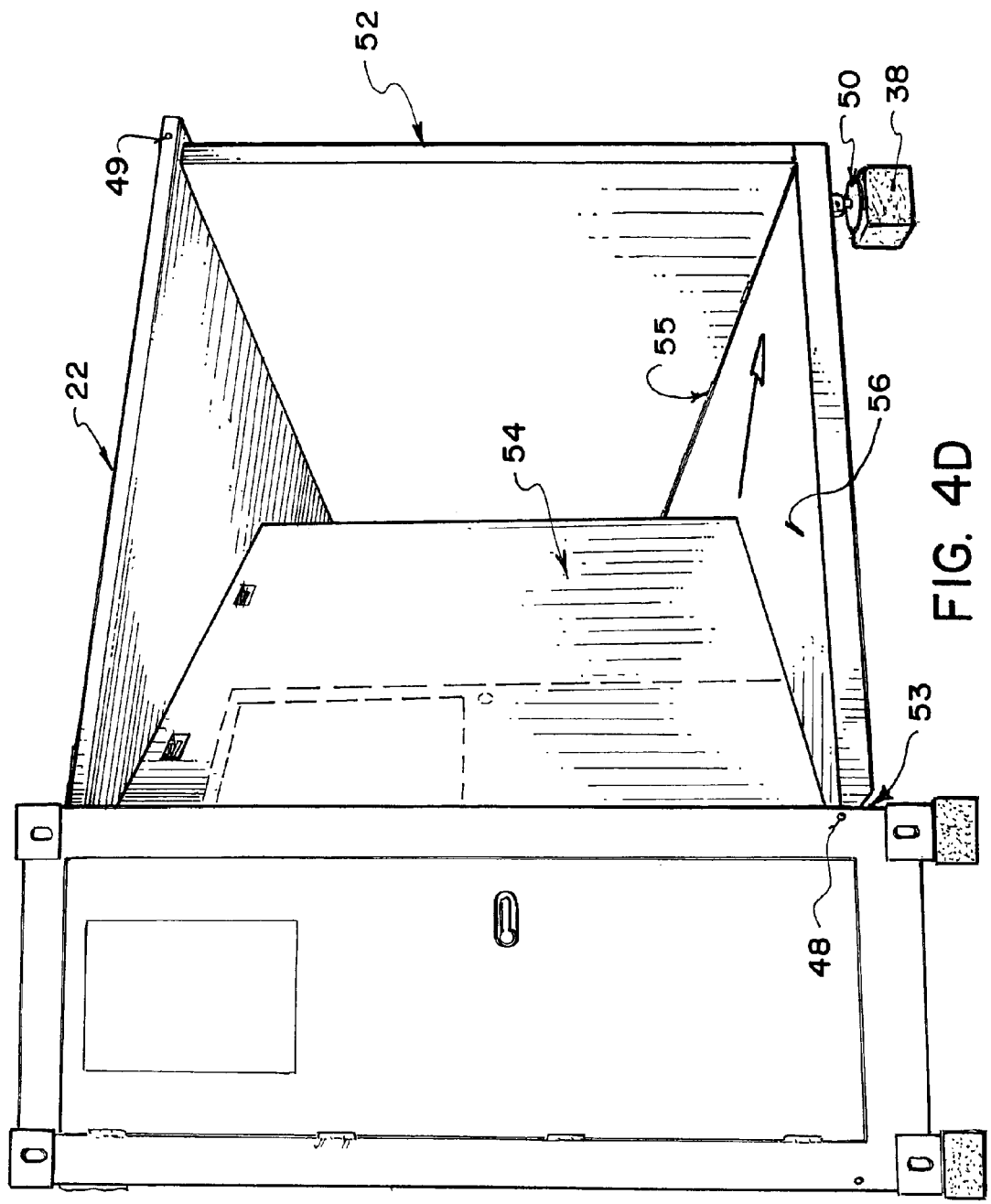
FIG. 4D is a front view of the modular unit shown in FIG. 4C further partially expanded.
Figure 5A:
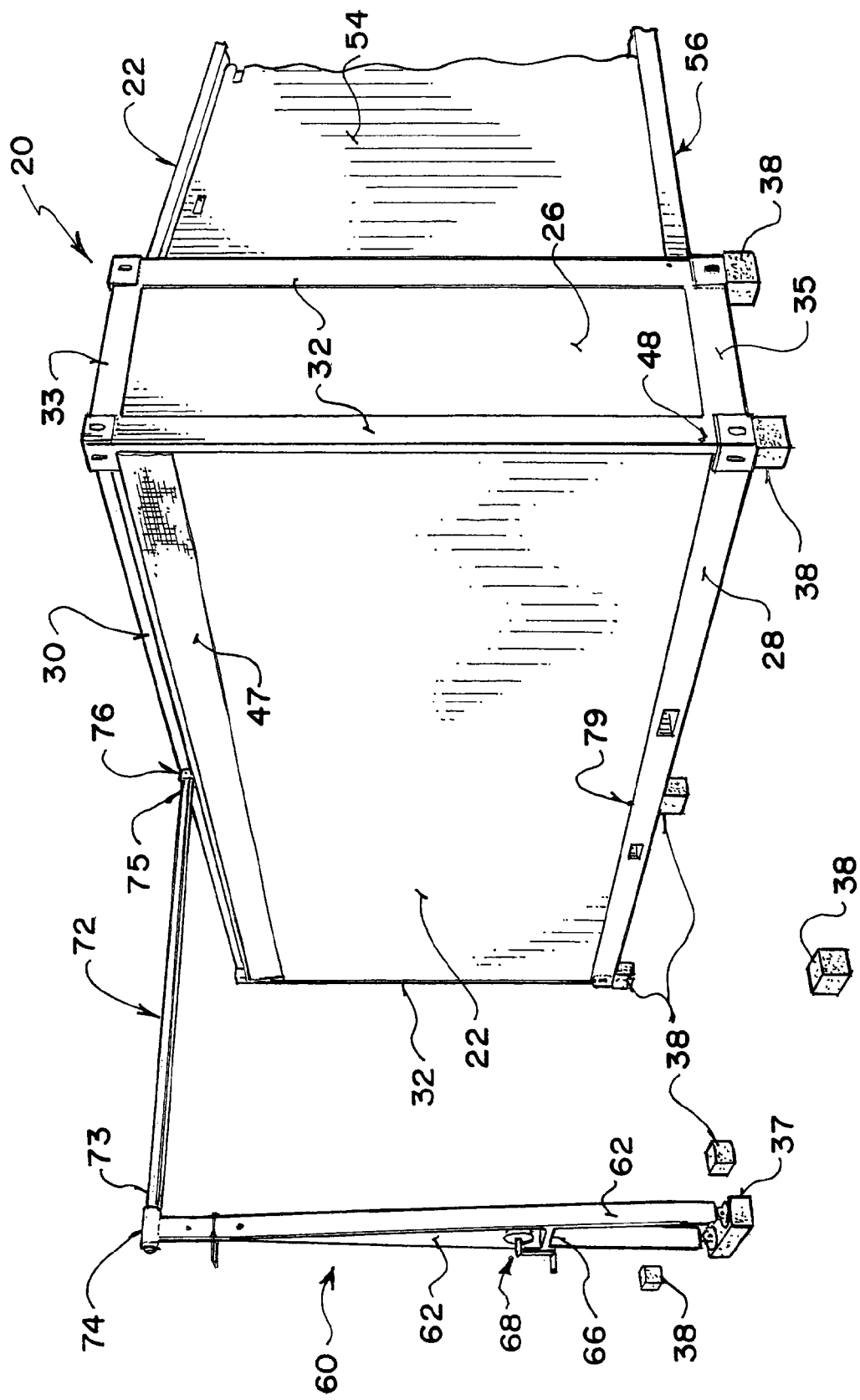
FIG. 5A is a perspective view of the modular unit shown in FIG. 4A with one side expanded and the crane attached to the second side of the modular unit.
Figure 5B:
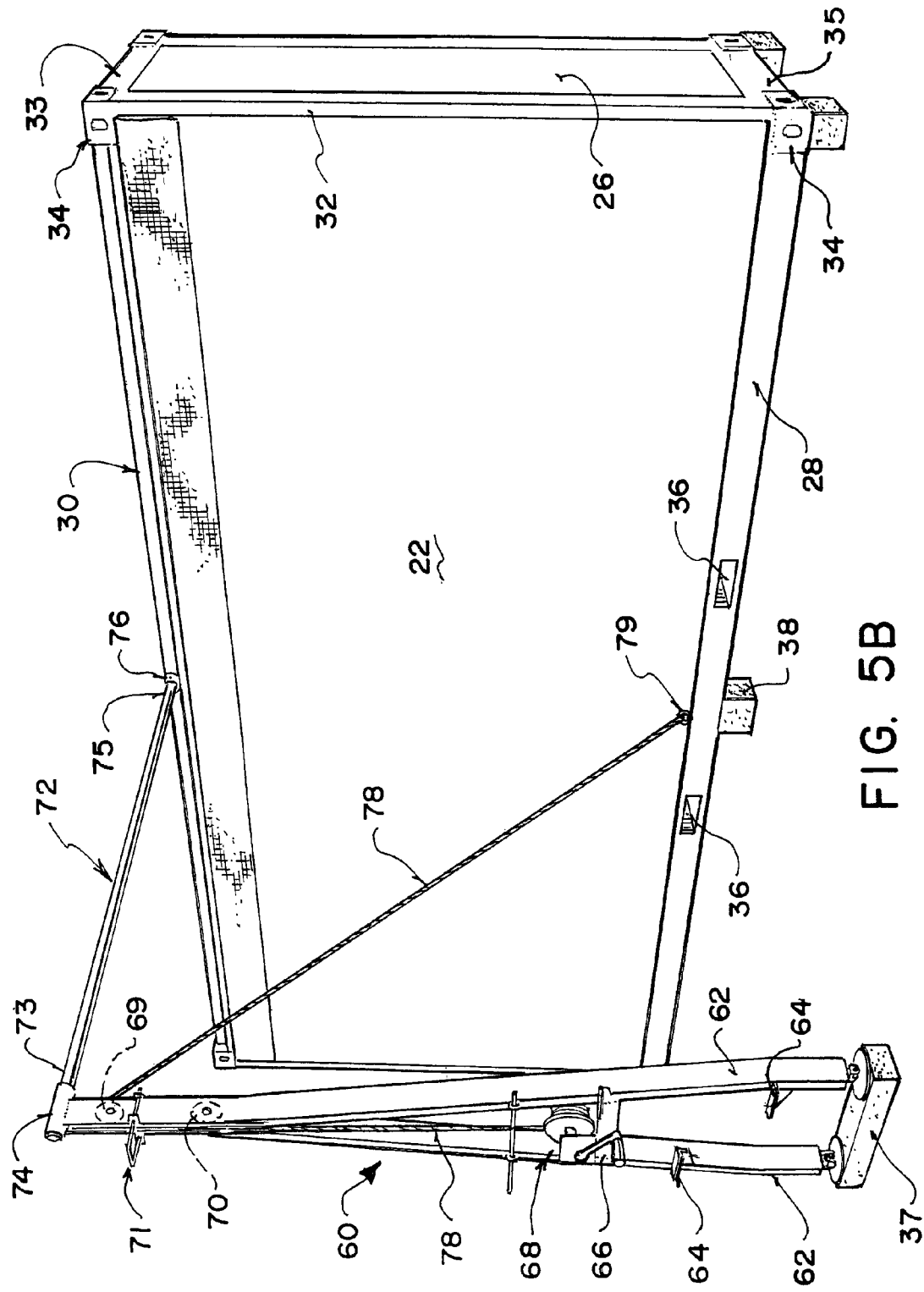
FIG. 5B is a perspective view of the modular unit shown in FIG. 5A showing the crane in greater detail.
Figure 5C:
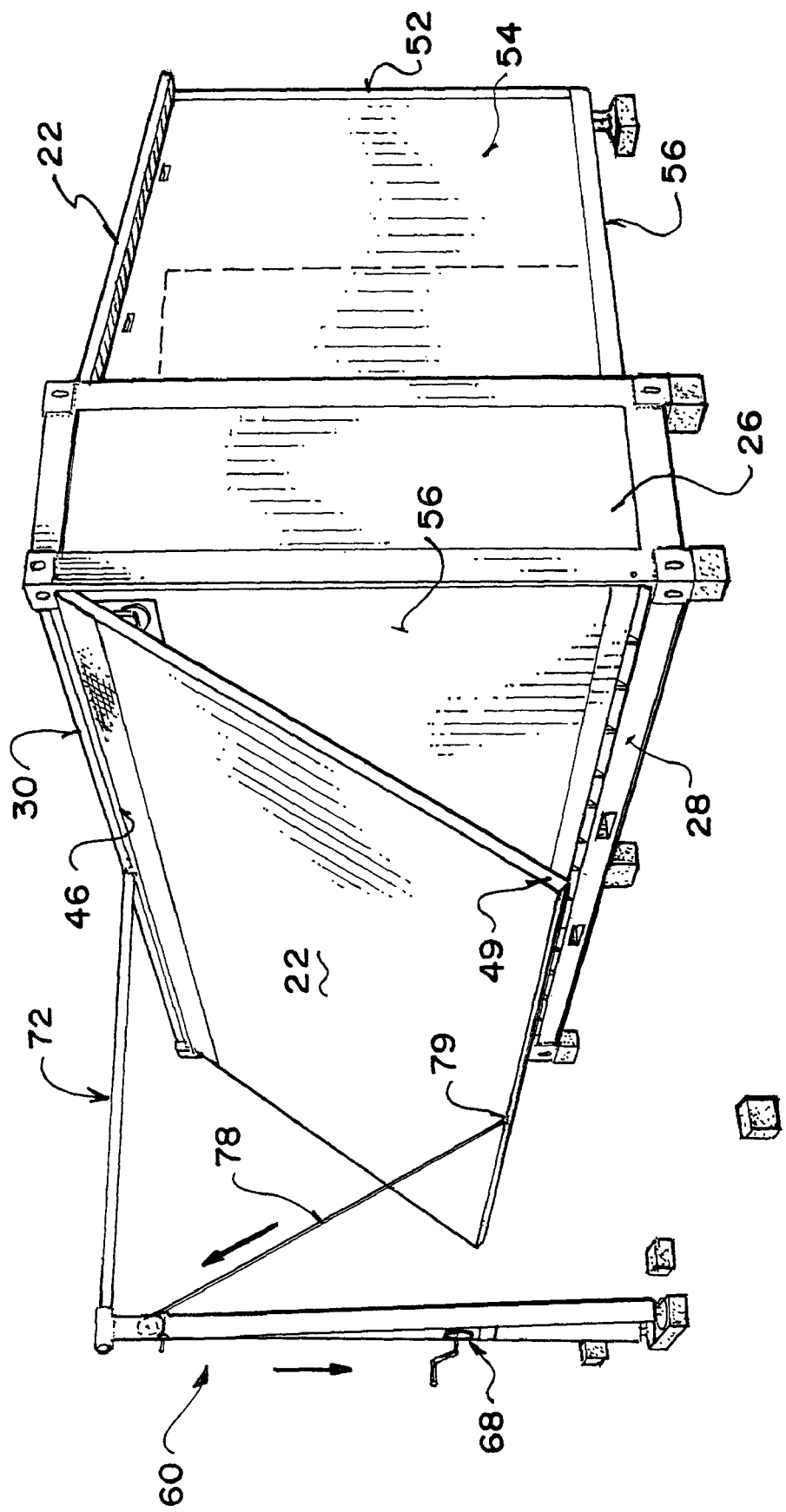
FIG. 5C is a perspective view of the modular unit shown in FIG. 5A partially expanded.
Figure 5D:
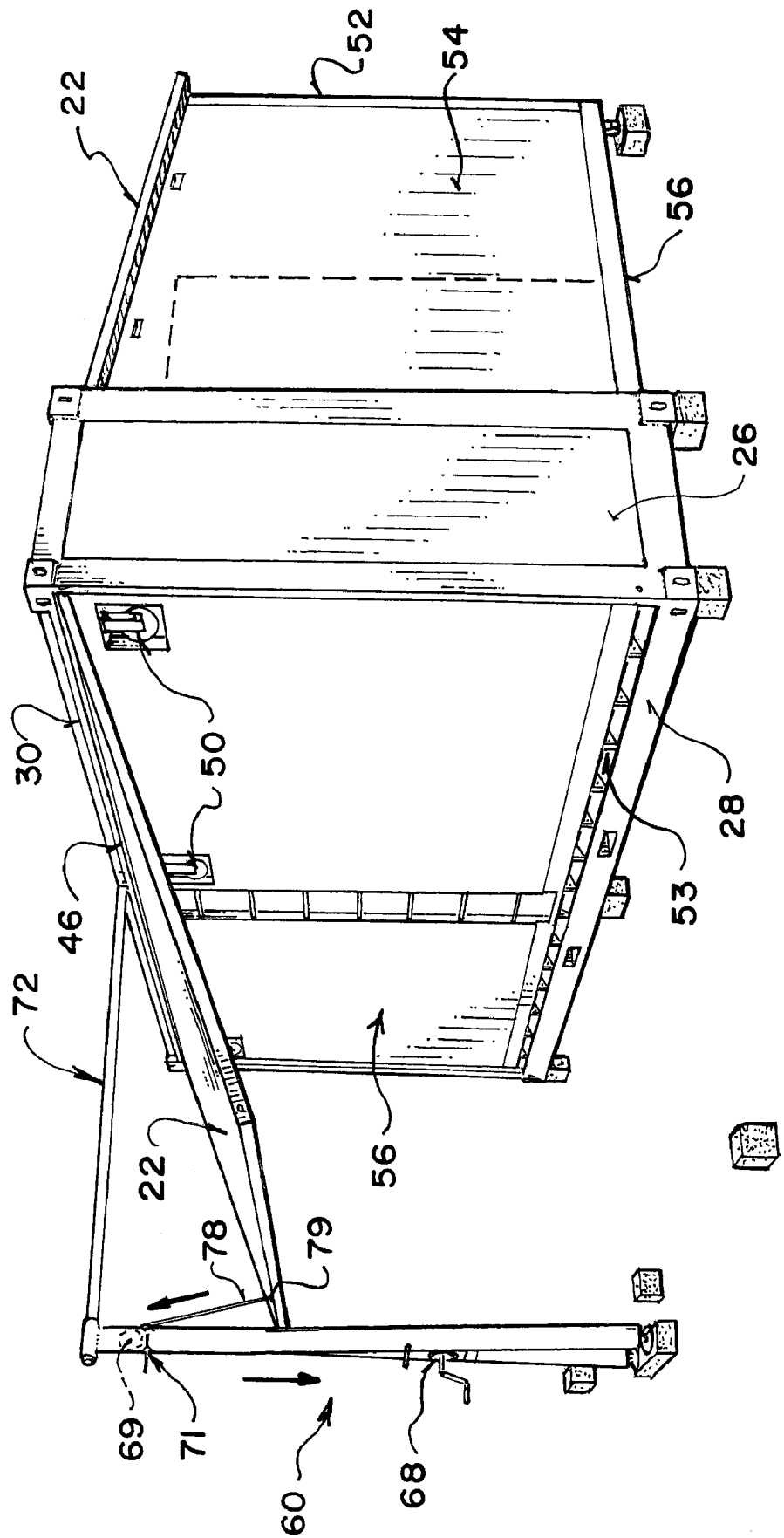
FIG. 5D is a perspective view of the modular unit shown in FIG. 5C further partially expanded.
Figure 6A:
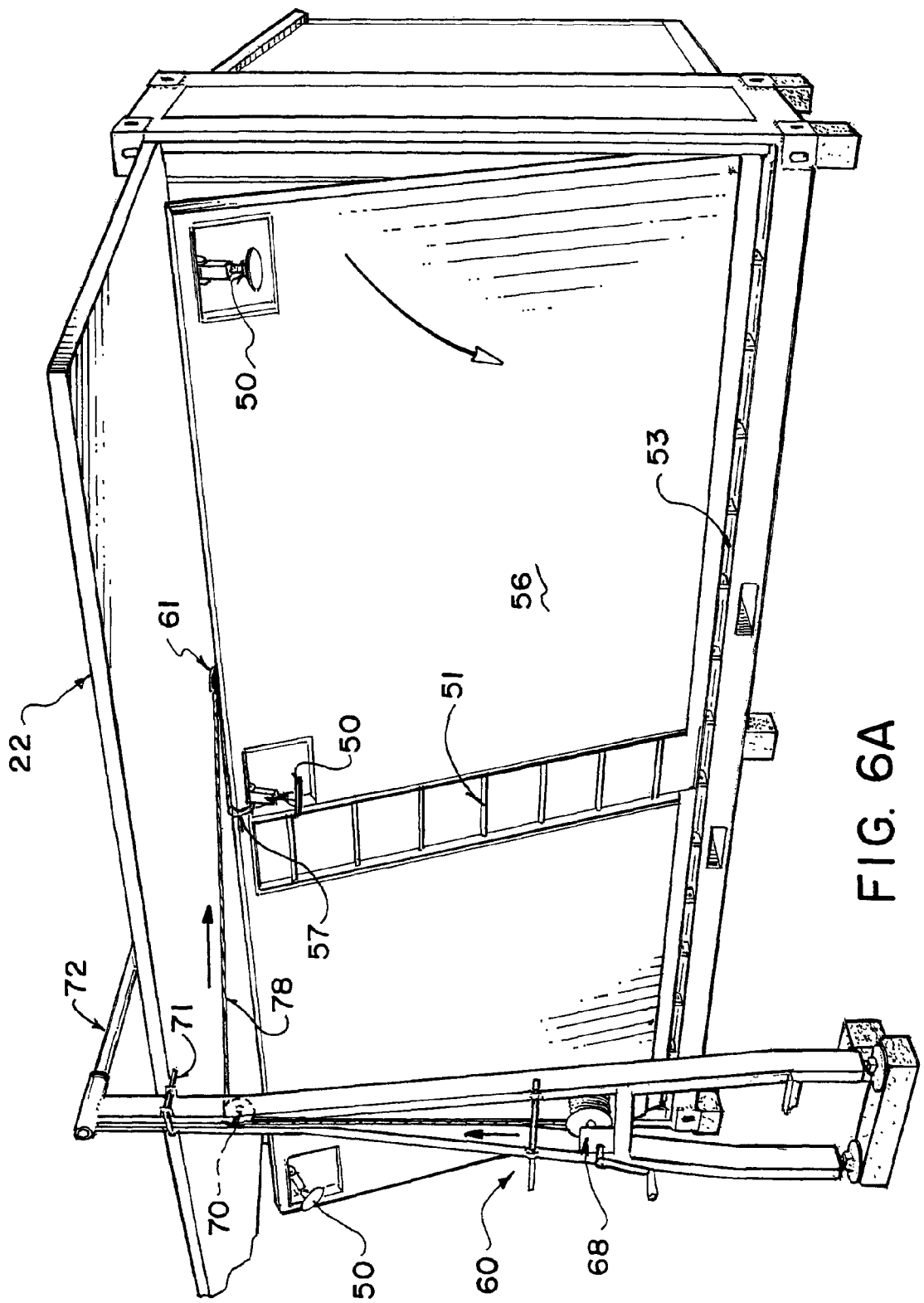
FIG. 6A is a perspective view of the modular unit shown in FIG. 5D in which the crane is lowering the floor section.
Figure 6B:
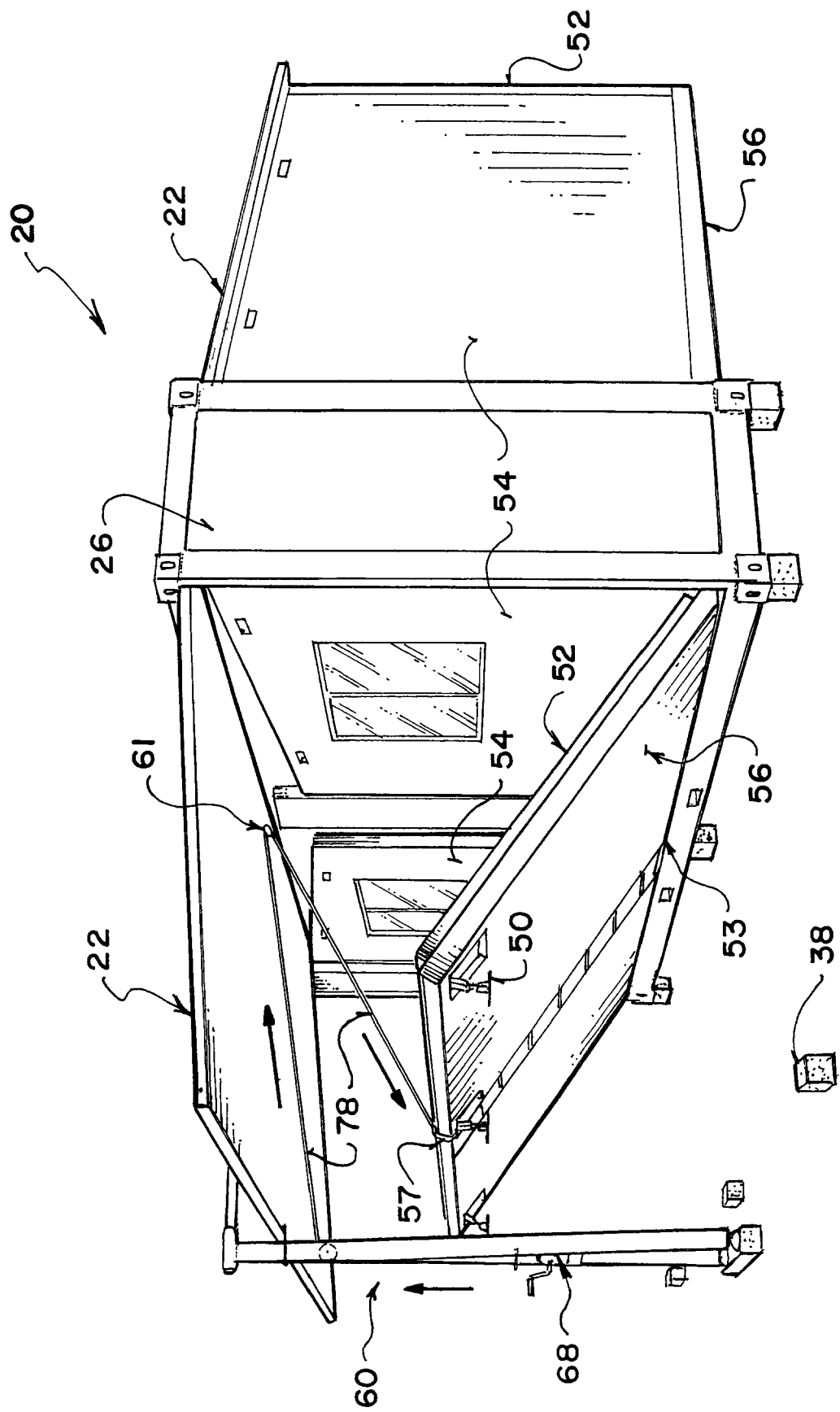
FIG. 6B is a perspective view of the modular unit shown in FIG. 6A further partially expanded.
Figure 6C:
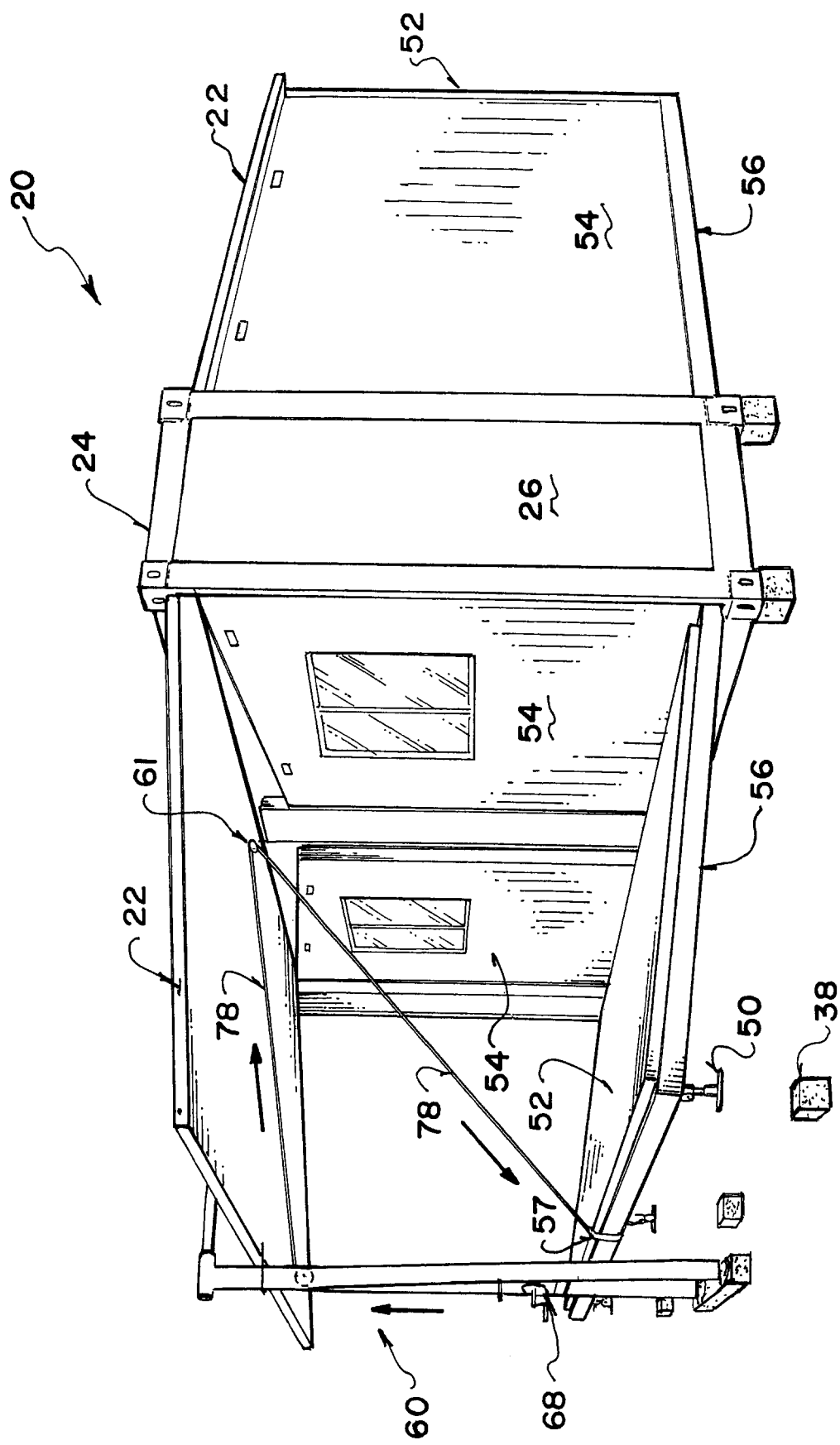
FIG. 6C is a perspective view of the modular unit shown in FIG. 6B further partially expanded.

The two side walls 22 are hinged along the upper edges thereof at 46 to allow them to pivot from a vertical position as shown in FIGS. 1 and 4A, where they are retained by bolts 48 extending into apertures 49 for shipping purposes, to the generally horizontal position shown in FIGS. 4C and 6C. Other latching mechanisms may be used to lock the side walls 22 in a vertical position to provide a rigid structure which can be lifted through pockets 36 or the ISO corner fittings 34, such as a nut and bolt arrangement, an alignment pin, pivoting handle, sliding bar, latch or other suitable arrangement.

In the expanded configuration shown in FIG. 3, side walls 22 form the roof sections, and the unit has two side walls 52, four end walls 54, and two floor sections 56. To facilitate the raising and lowering of sides 22, floor sections 56 and walls 52, a crane 60 as shown in FIGS. 4-7, 18 and 19 can be used. Crane 60 has vertical uprights 62 on support block 37, and horizontal steps 64 to form a ladder, hand winch platform 66 supporting hand winch 68, and pulleys 69, 70 and sliding support bar 71. One end 73 of horizontal pole 72 is placed in sleeve 74 in the upper end of crane 60 and crane 60 is then raised to the vertical position on support block 37 and the second end 75 of pole 72 is extended into aperture 76 in the side rail 30 of modular unit 20. Cable 78 is extended over pulley 69 and attached to an eye 79 in the lower edge of side 22. Winch 68 then is rotated to raise side 22 to a generally horizontal position as shown in FIGS. 4C and 6C and sliding support bar 71 is slid under the edge of side 22 to support it on crane 60. Cable 78 is then released.

FIG. 4-8 show the process for expanding the unit. First one side is expanded (FIG. 4A-4D) and then the crane 60 is moved to the other side (FIG. 5A) and the second side of the modular unit is expanded. Using the crane 60 the unit can be expanded and collapsed by one individual. Side wall 22 is first unlatched by removing bolts 48 and then raised by crane 60 as described above, and held by crane 60 in the horizontal position. See FIG. 5A-5D. The cable 78 is then unhooked from side 22 and re-threaded over the lower pulley 70, and then hooked through pulley 61 on roof section 22 and then into a hook or eye on the upper edge of floor section 56 at 57. A ladder 51 may be provided in floor section 56 to facilitate this. Floor section 56 is hinged at lower edge 53 and is lowered using winch 68 after releasing bolts or other securement provided to secure it in the vertical position, and releasing pivoting support feet 50.

Figure 6D:
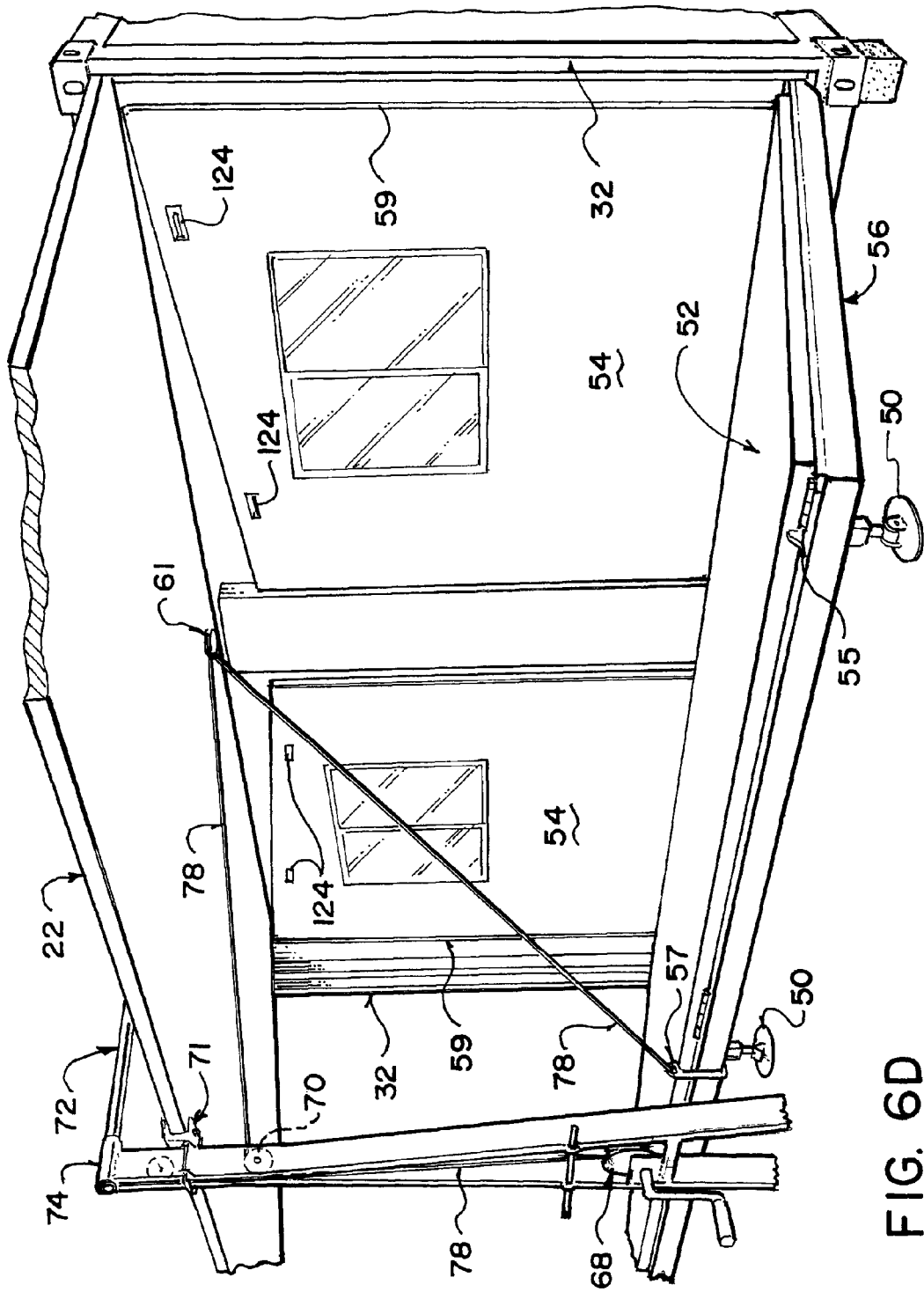
FIG. 6D is a perspective view of the modular unit shown in FIG. 6C further partially expanded.
Figure 6E:
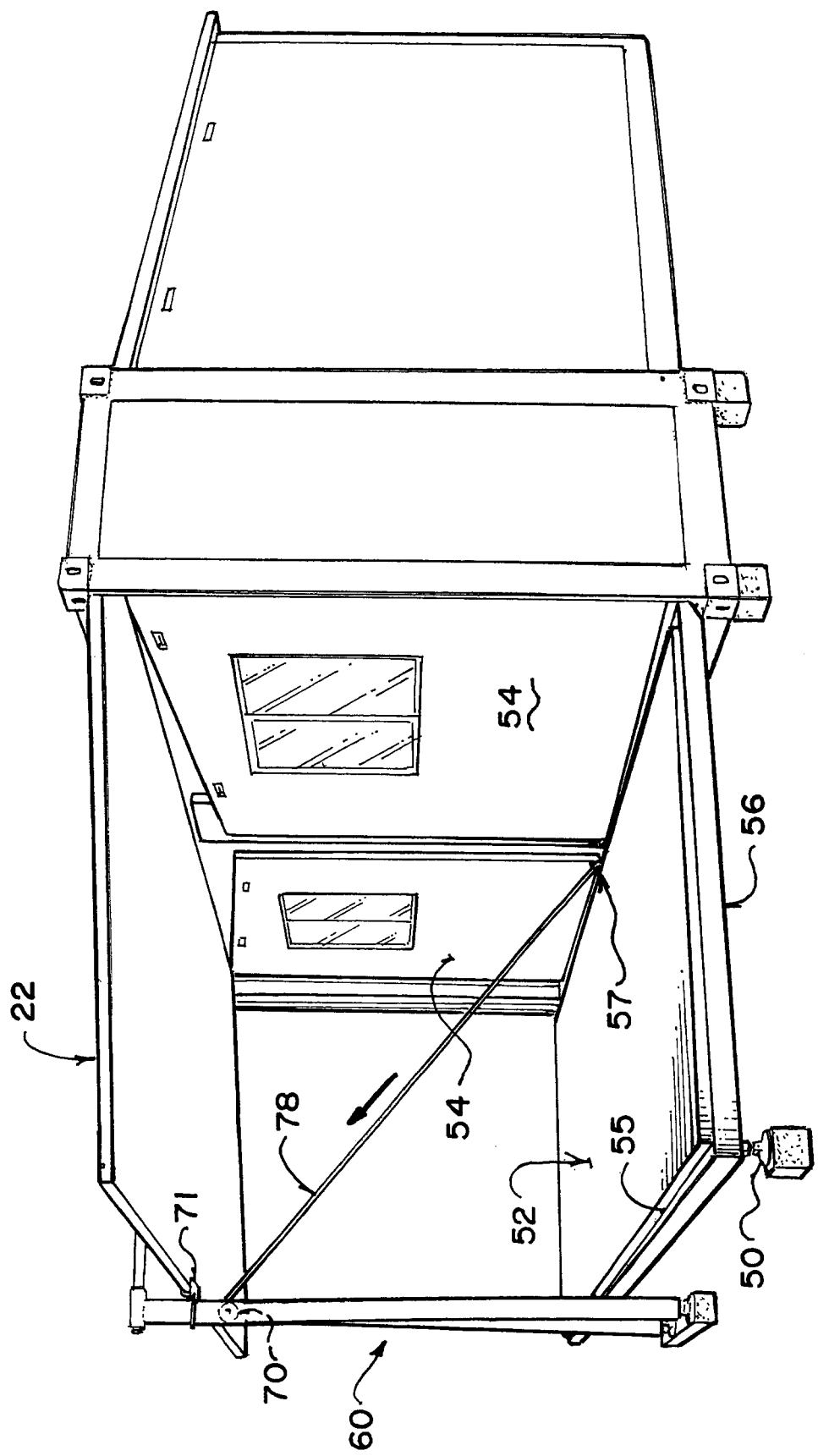
FIG. 6E is a second perspective view of the modular unit shown in FIG. 6C further partially expanded.
Figure 7A:
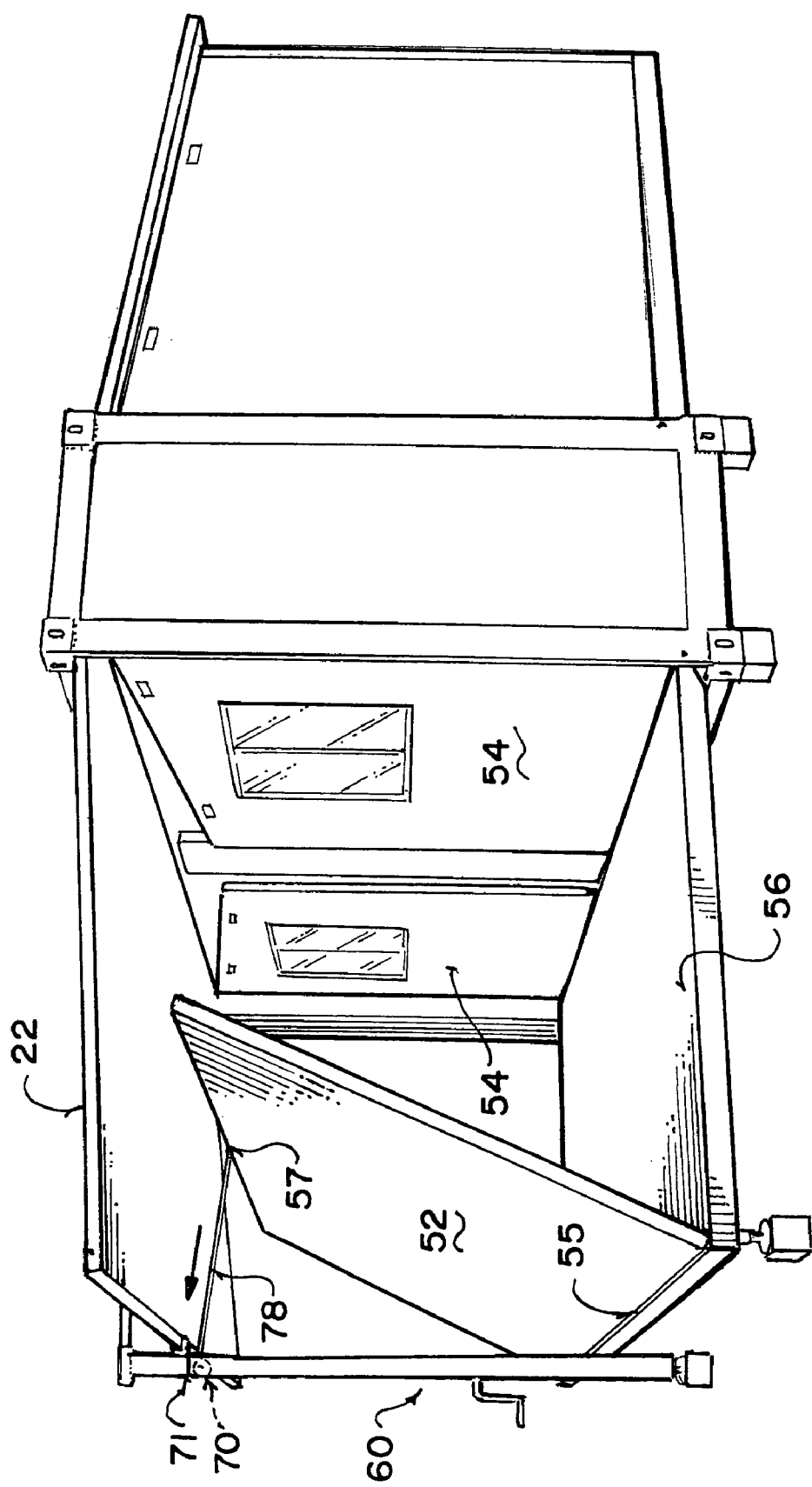
FIG. 7A is a perspective view of the modular unit shown in FIG. 6D further partially expanded in which the crane is raising the side wall section.
Figure 7B:
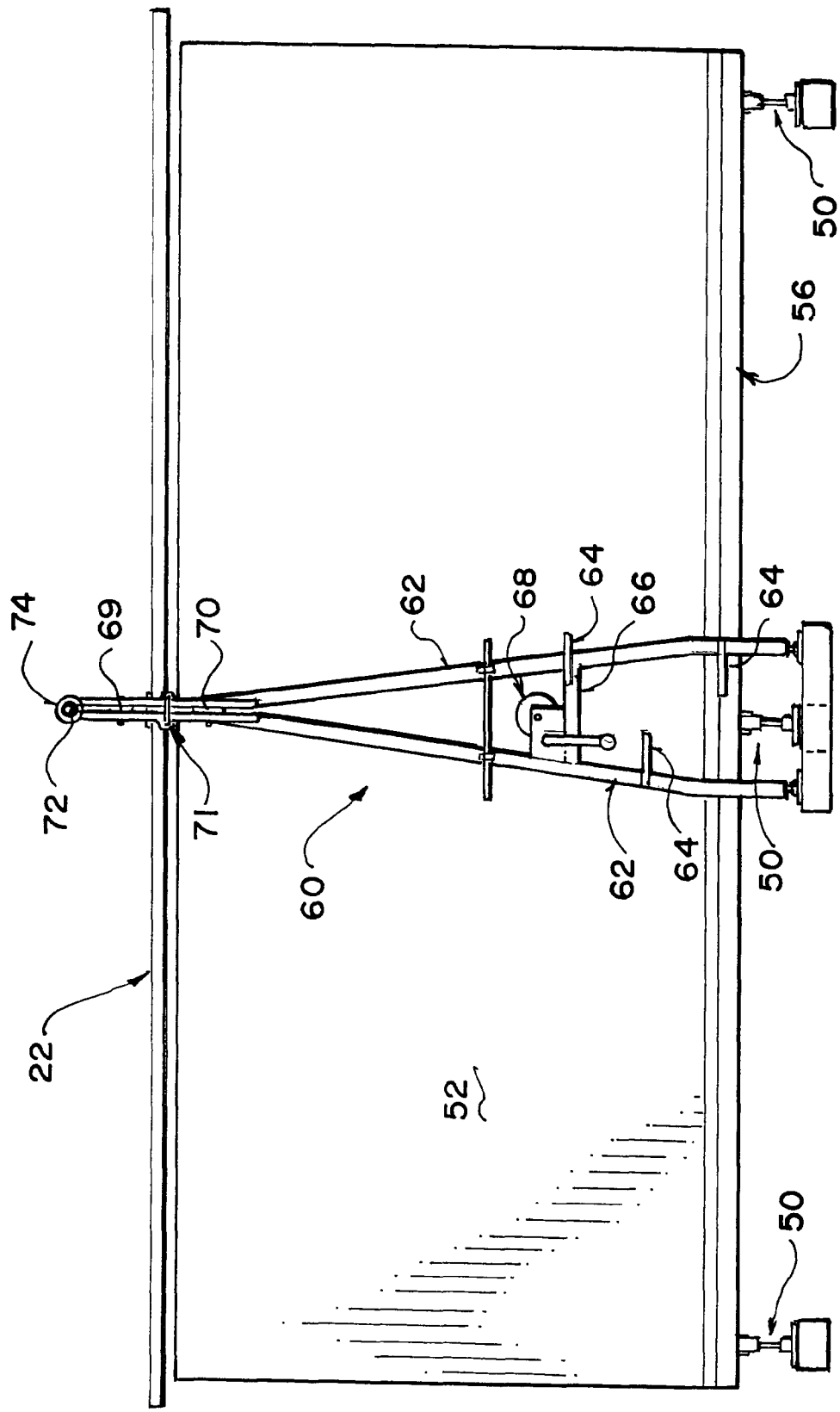
FIG. 7B is a side view of the modular unit shown in FIG. 7A with the side wall raised.
Figure 21:
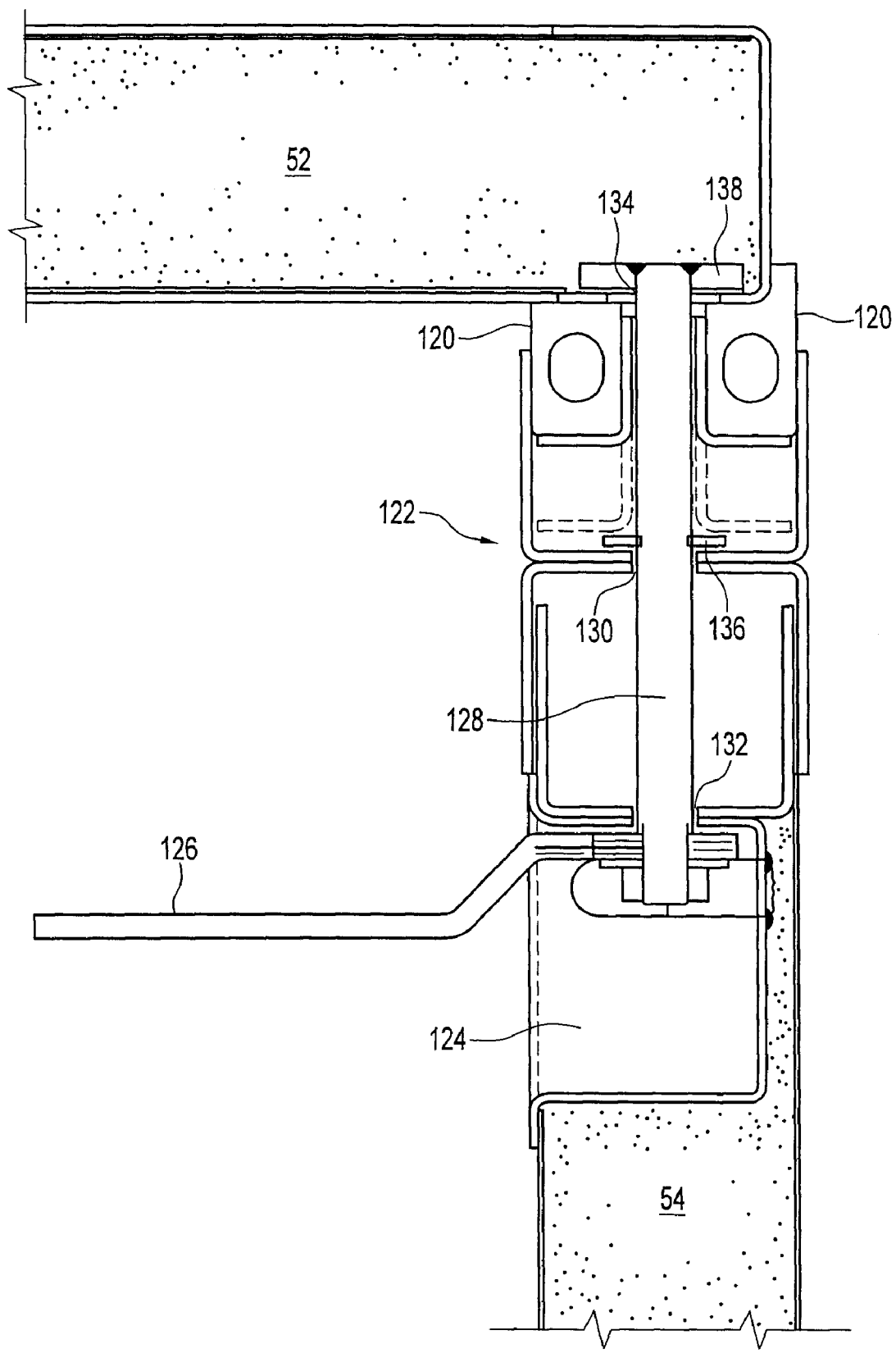
FIG. 21 is a horizontal cross-section of a latching mechanism for use in the invention.

Once the floor section 56 is lowered to the horizontal position shown in FIG. 6D supported on feet 50 on support blocks 38 (FIG. 6C), then the side wall 52 is raised by reconnecting the end of cable 78 to a hook or eye 57 on the upper edge of section 52, which is hingedly connected to floor section 56 along edge 55. Side wall 52 is then winched to the vertical position. The two end walls 54 are hinged along edges 59 to the vertical beams 32 of modular unit 20 and are swung outwardly into position aligned with the edges of roof 22 and floor 56. Cable 78 is then reconnected to roof 22 through pulley 69 to raise roof 22 slightly off support bar 71 so bar 71 can slide back out of interaction with roof 22. Roof 22 is then lowered onto the upper edges of side wall 52 and end walls 54 which compresses rubber sealing gaskets provided on the upper edges to form a waterproof seal. Rubber gaskets 120 are also provided along the vertical edges of end walls 54 (FIG. 21). The seal between the side and end walls and roof is further tightened and secured using the latches 122 shown in FIG. 21. Latches 122 are provided in recesses 124 on the outer upper edge of end walls 54 and the inner vertical and lower edges of end wall 54. Rubber sealing flap 46 is provided along the upper edge of side wall 22 to prevent the ingress of rain water when the unit is expanded.

While in the illustrated embodiment side walls 22 form the roof sections of the expanded shelter, the invention could also be configured so that side walls 22 are hinged along their lower edges and form the floor sections when expanded, with the interior panel sections forming the roof sections and vertical walls of the expanded shelter.

Figure 9:
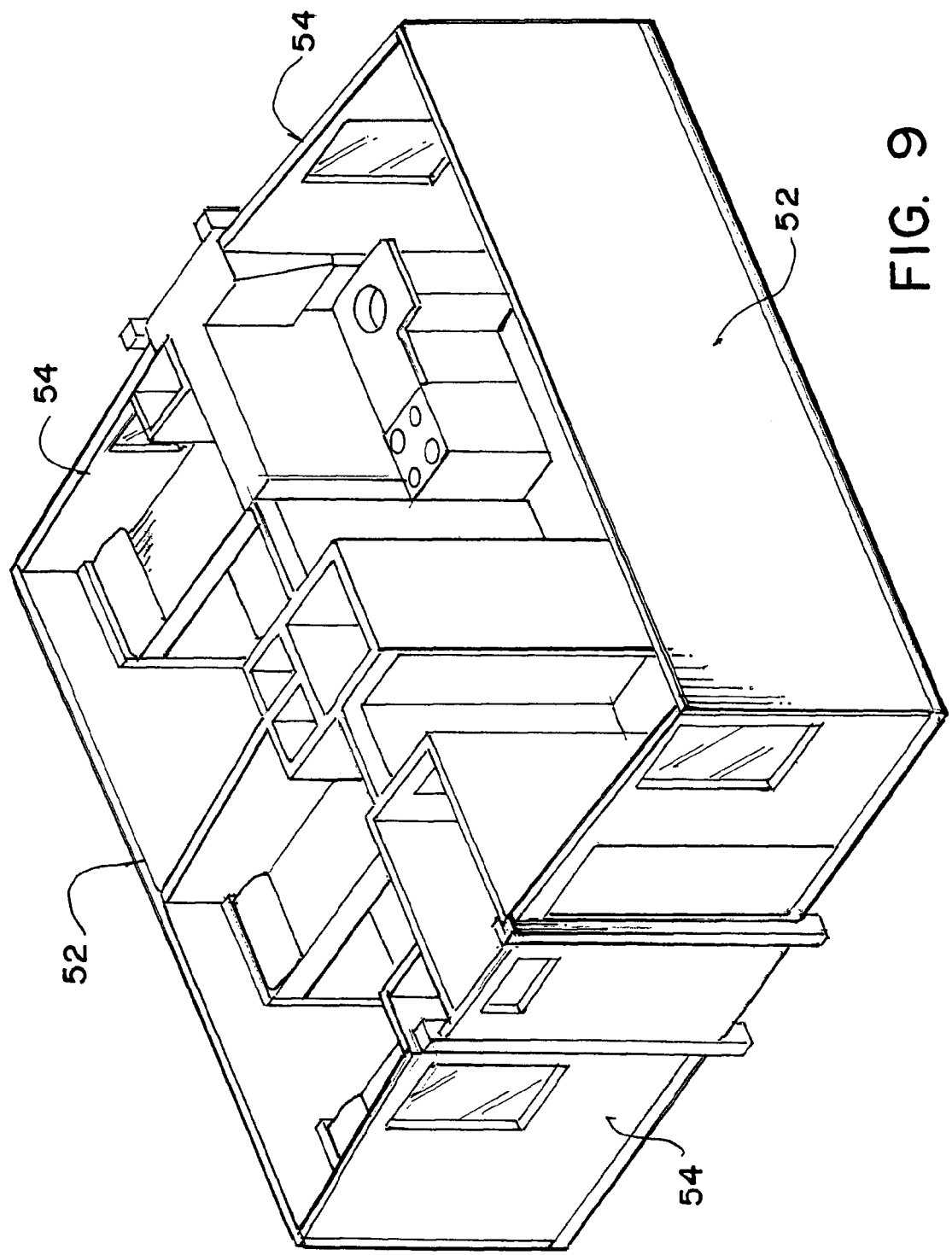
FIG. 9 is a perspective view of a modular unit according to the invention in expanded state with the roof removed to illustrate the floorplan.
Figure 10:
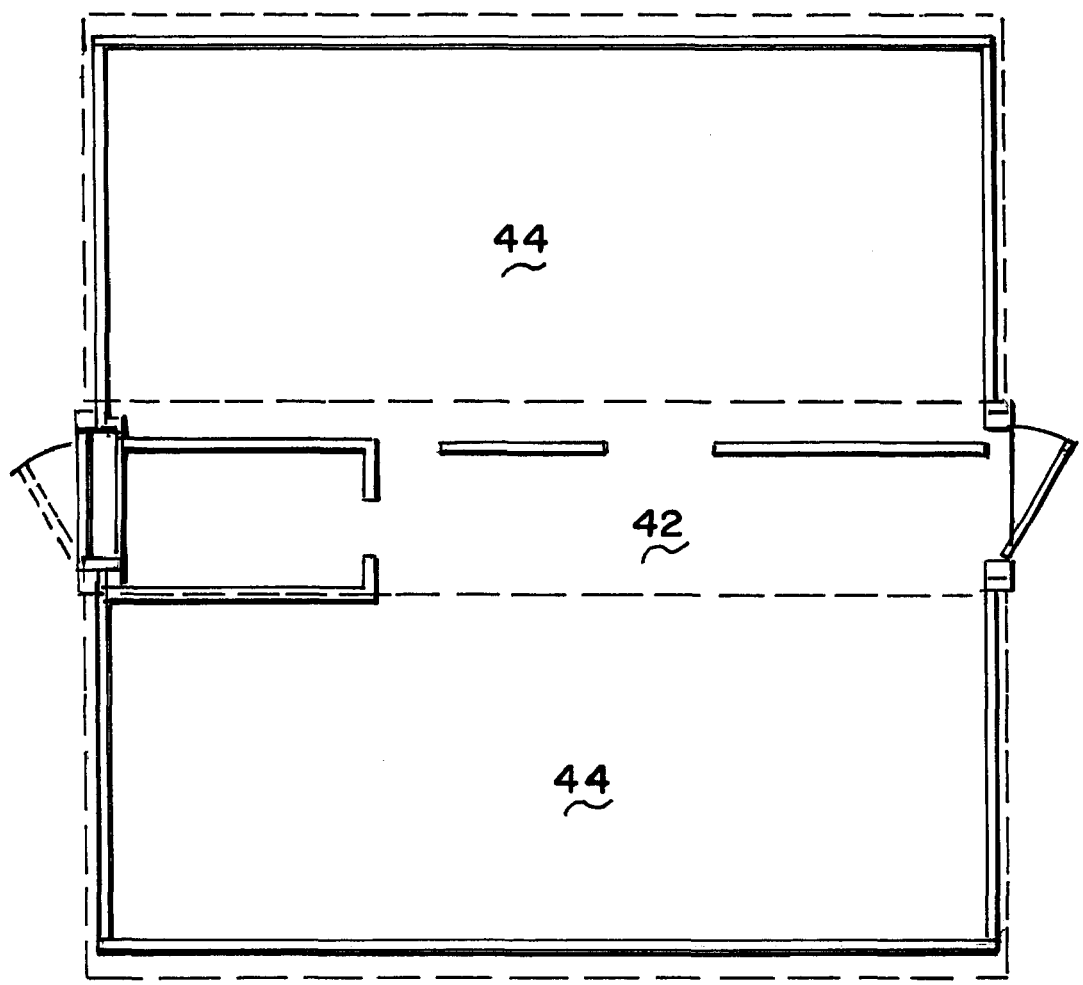
FIG. 10 is a cross-section view taken along lines 10-10 of FIG. 12.
Figure 11:
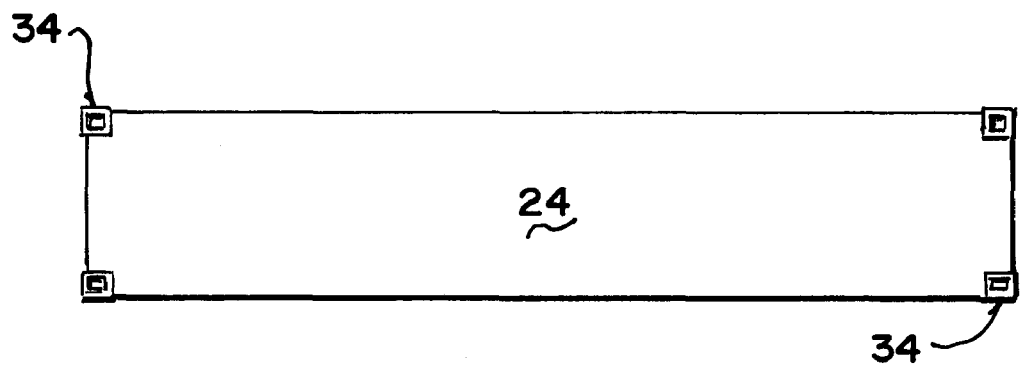
FIG. 11 is a top view of the collapsed modular unit as shown in FIG. 1.
Figure 12:
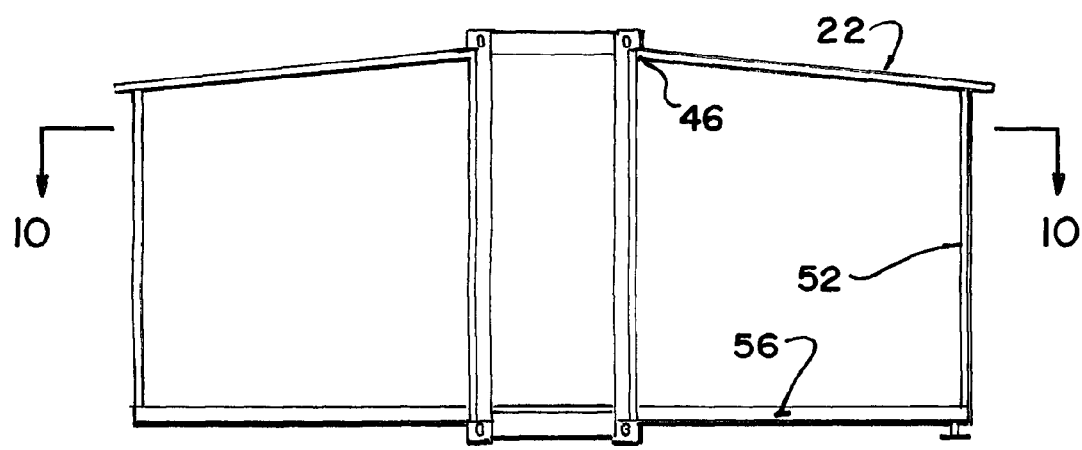
FIG. 12 is an end view of the modular unit in expanded state as shown in FIG. 3.
Figure 15:
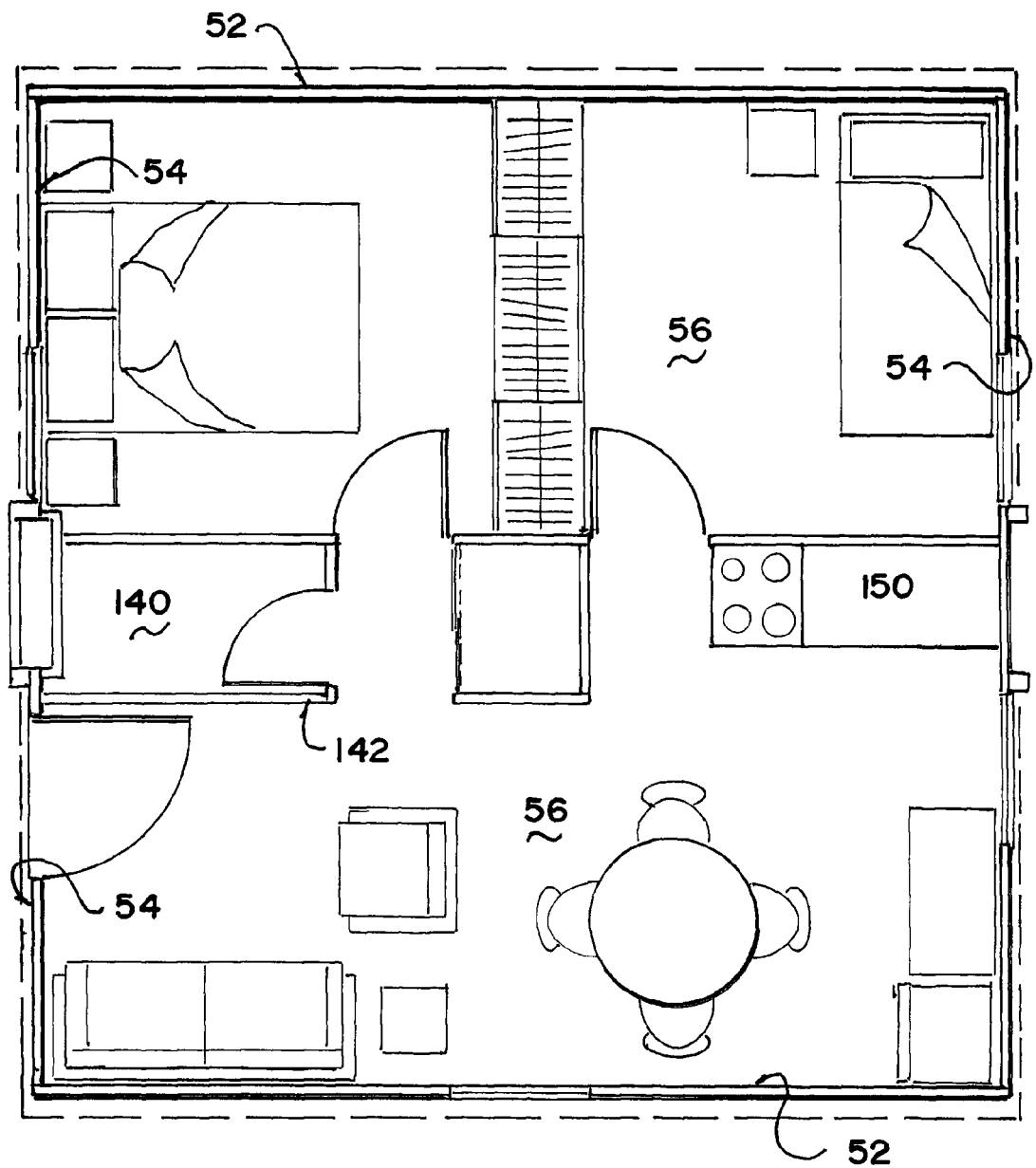
FIG. 15 is a cross-section view taken along lines 15-15 of FIG. 16 illustrating an alternate floor plan.
Figure 16:
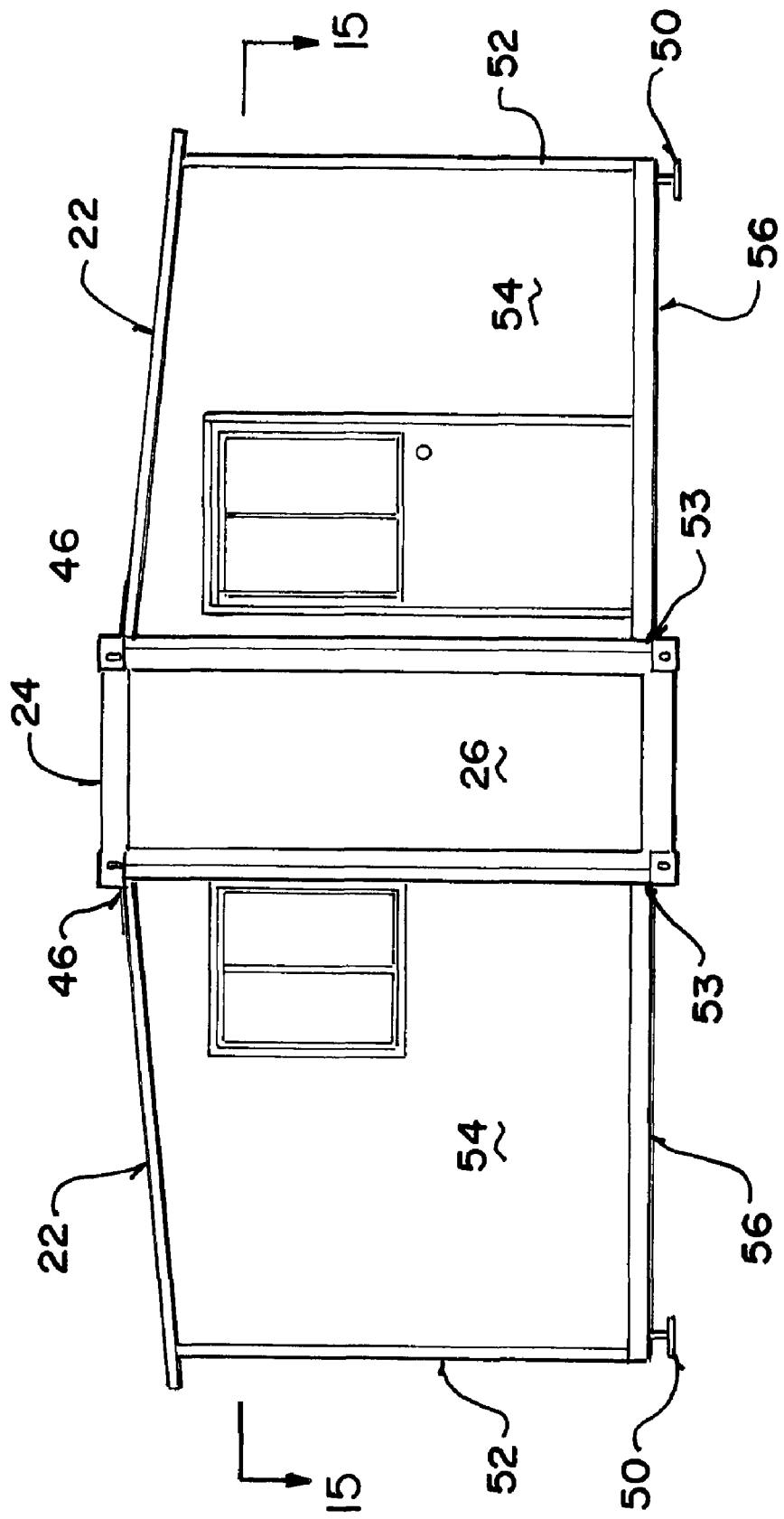
FIG. 16 is an end view of the modular unit in expanded state as shown in FIG. 3.
Figure 17:
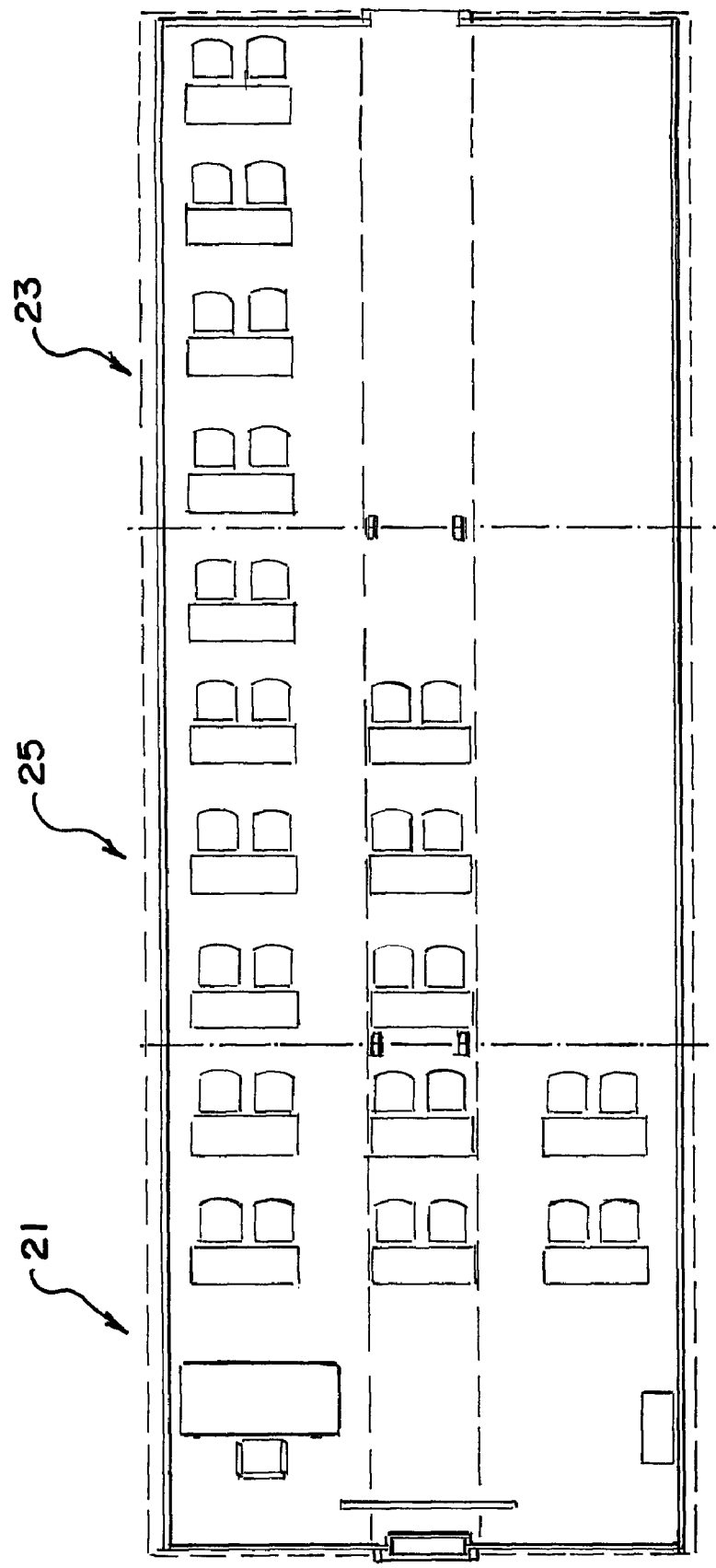
FIG. 17 is a cross-section view illustrating an alternate floor plan combining 3 modular units.

As shown in FIGS. 9 and 15, plumbing 140, electrical, and kitchen appliances 150 may be provided in the central section of modular unit 20. To provide extra space for a bathroom for example when expanded, partitions 142 can be hinged to extend beyond the dimensions of the collapsed modular unit 20 when it is expanded. Doors and/or windows can be provided in end walls 54 and side walls 52 which are thereby protected during shipping. As shown in FIG. 16, two or more levelling feet 50 are pivotally attached to the outside of floor 56 to support and level the floor 56 when in a lowered position. As shown in FIG. 10, the structure in its opened configuration has a floor space which is about 5 times the floor space of the modular unit. FIG. 17 illustrates that a plurality (three as shown) of modular units 20 can be connected end-to-end so that interior space of the expanded shelter is enlarged. In that case end walls 54 are not provided in one end of the outer modular units 21, 23 or either end of the central modular unit 25.

To collapse the structure to its shipping configuration, the process shown in FIG. 4-8 is carried out in reverse and side walls 22 are secured by bolts 48 in the vertical position. This can all be accomplished by one or more unskilled personnel. The modular unit 20 can then be connected to one or more modular units 20 as appropriate and shipped by truck, rail, ship, airplane as a standard ISO shipping container, or shipped as an individual modular unit.

Figure 8A:
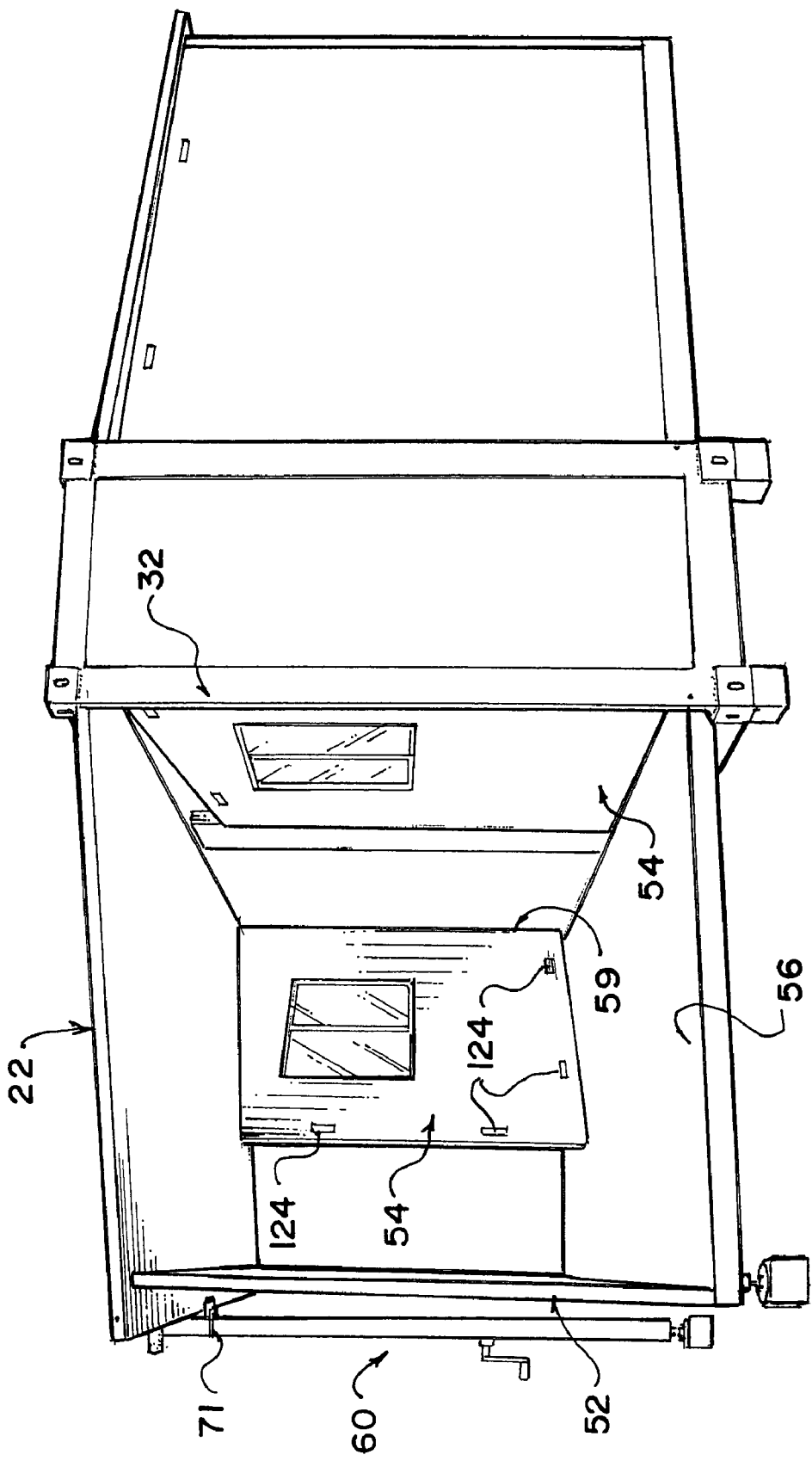
FIG. 8A is a front view of the modular unit shown in FIG. 7C further partially expanded.
Figure 8B:
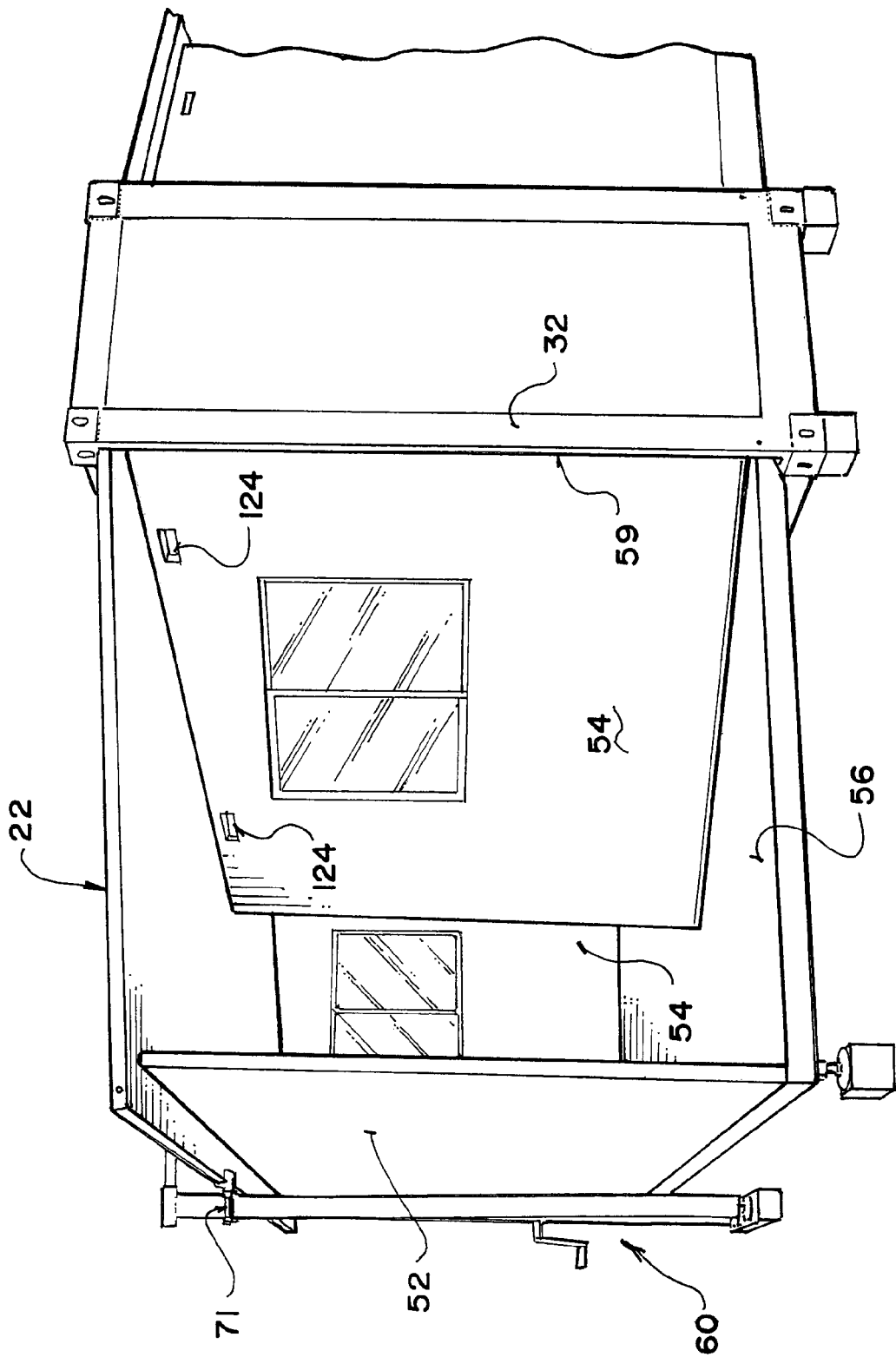
FIG. 8B is a front view of the modular unit shown in FIG. 8A further partially expanded.
Figure 8C:
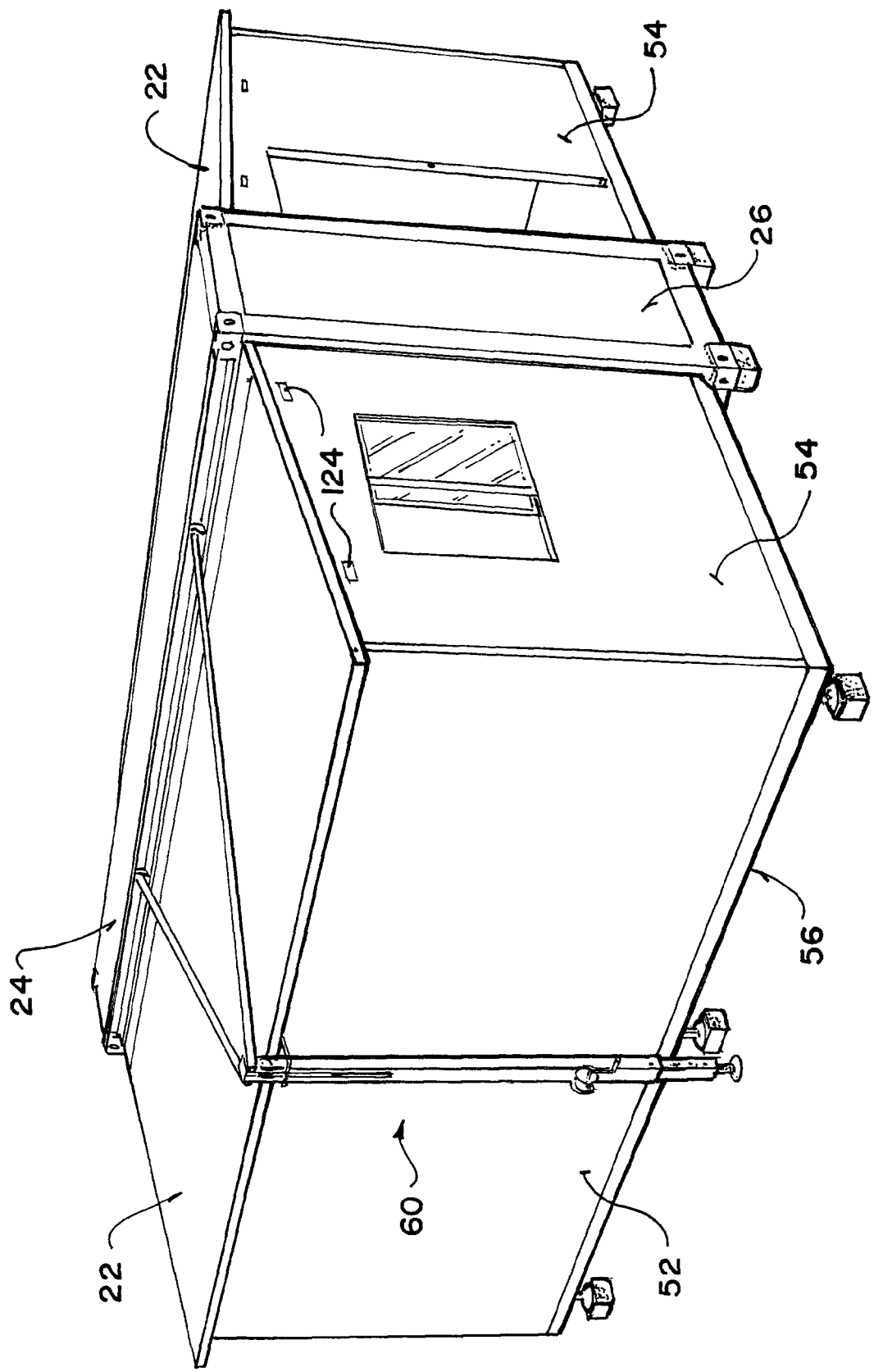
FIG. 8C is a perspective view of the modular unit shown in FIG. 4A in expanded state.
Figure 8D:
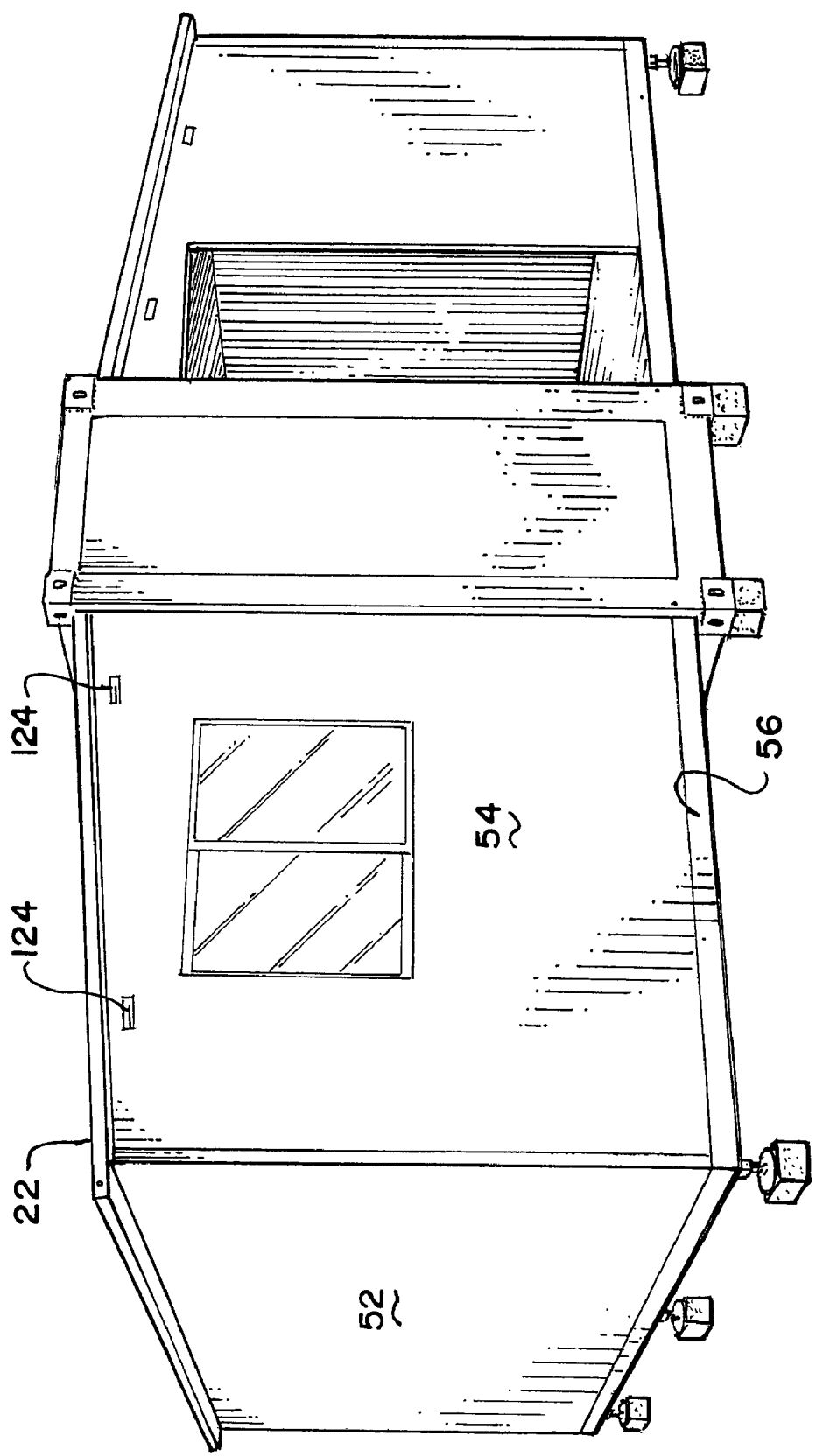
FIG. 8D is a second perspective view of the modular unit shown in FIG. 4A in expanded state.
Figure 18:
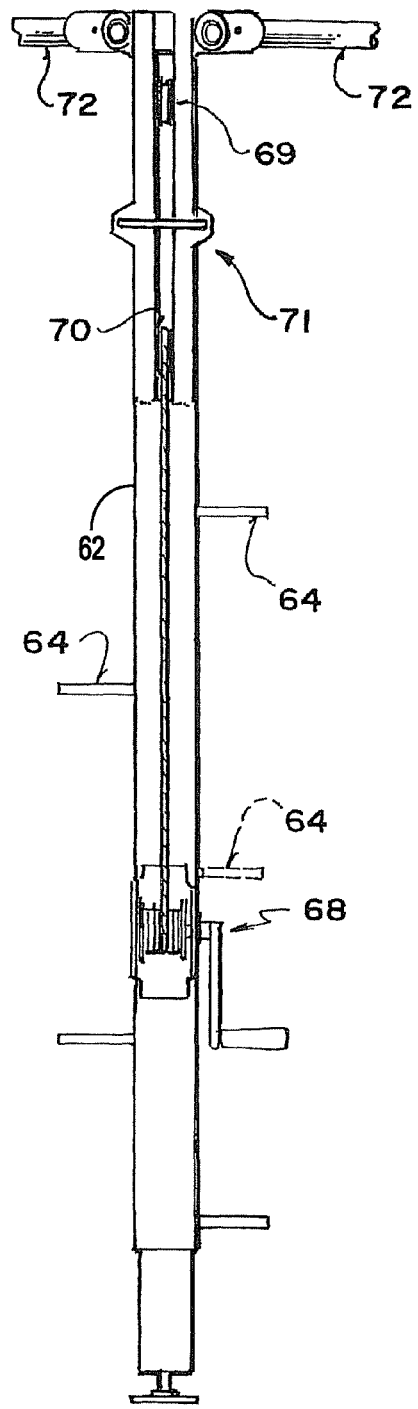
FIG. 18 is a front elevation view showing an embodiment of the crane used in the invention.
Figure 19:
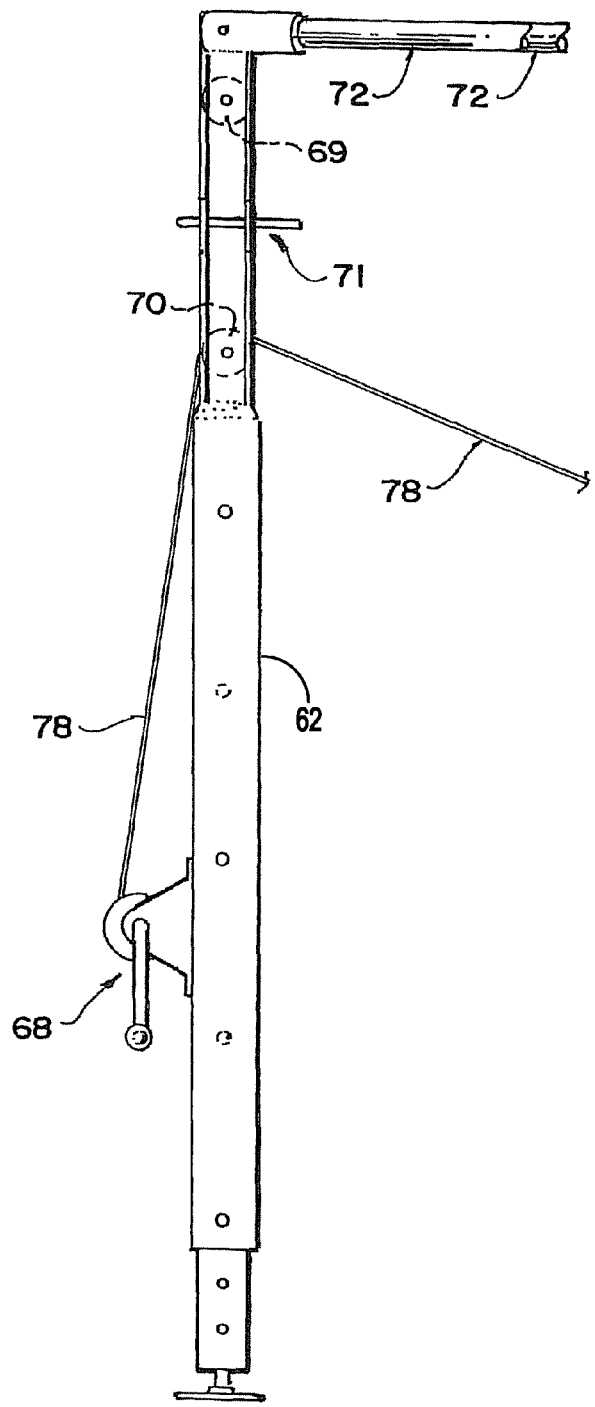
FIG. 19 is a side elevation of the crane shown in FIG. 18.
Figure 20A:
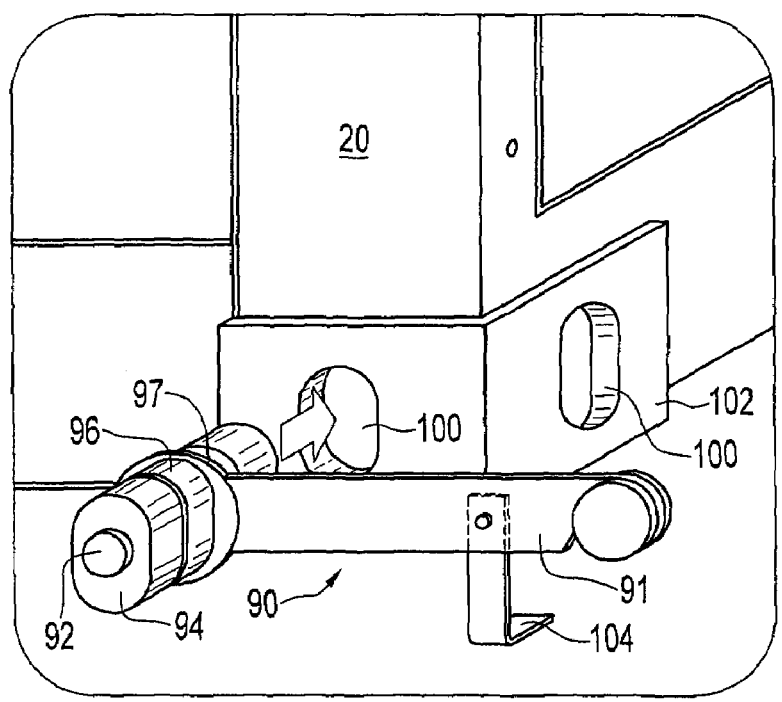
FIG. 20A through 20E are perspective views of the connector device used in the invention.
Figure 20B:
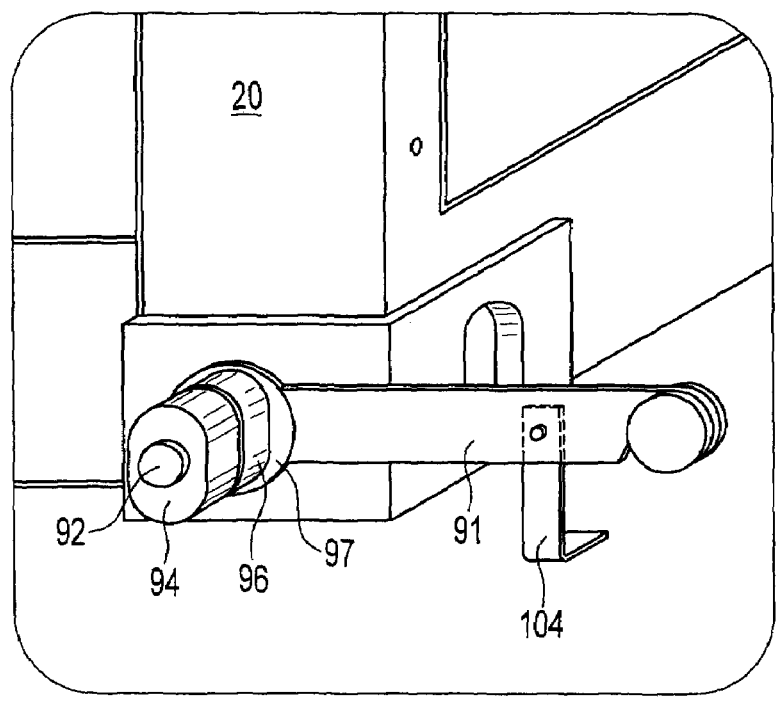
Figure 20C:
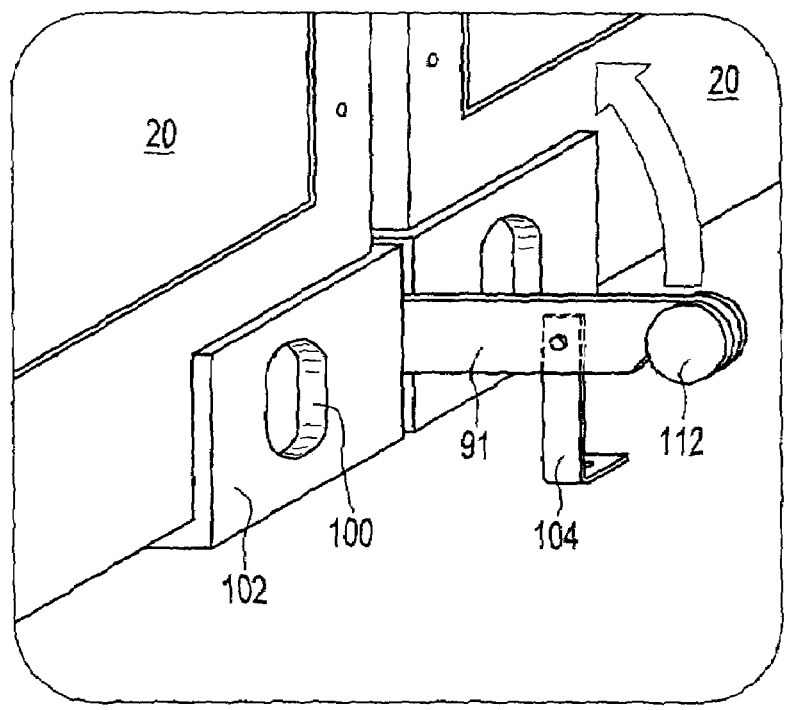
Figure 20D:
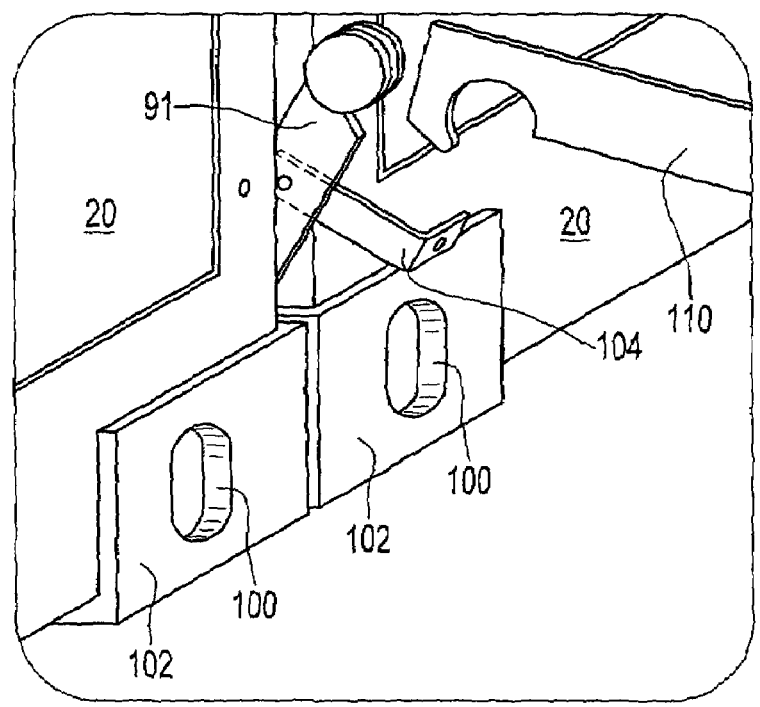
Figure 20E:
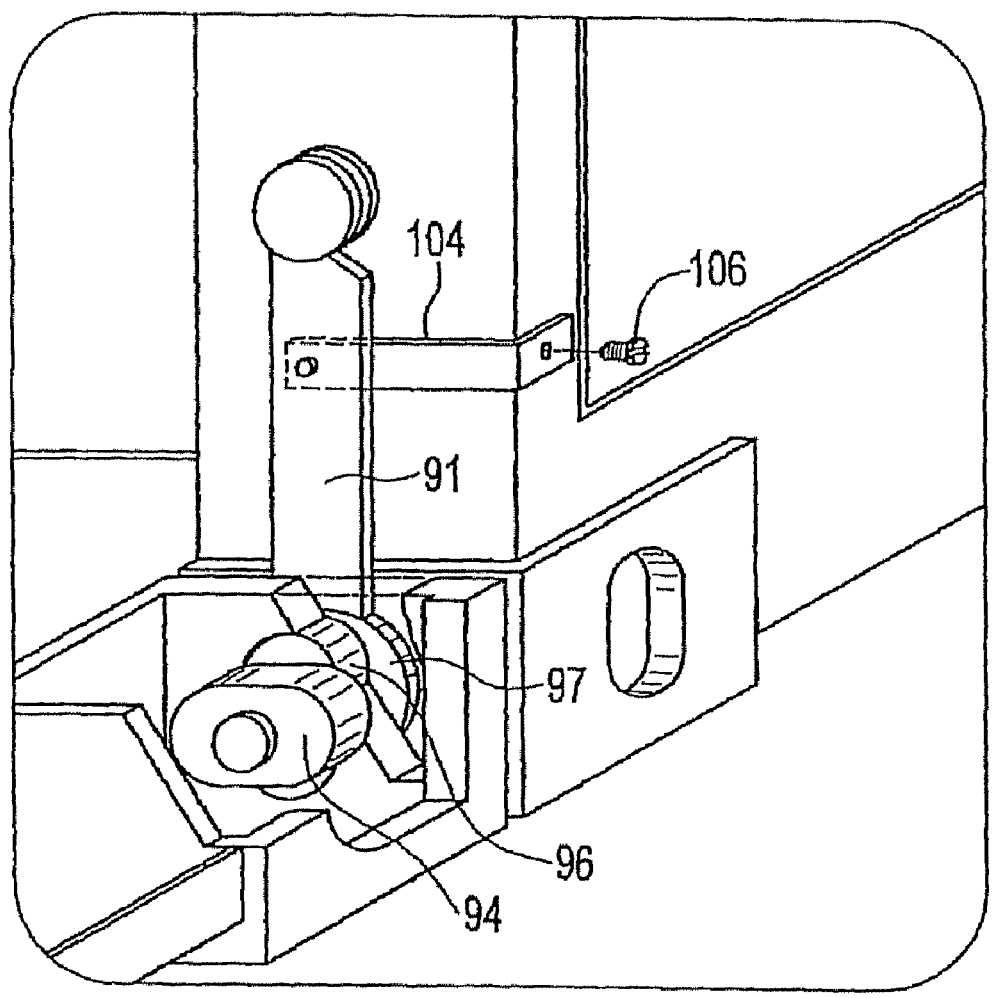

FIGS. 8C, 18 and 19 illustrate a second embodiment of crane 60 having a single telescopic upright element 62 and two angled horizontal poles 72.

FIG. 20 illustrates a connector 90 used to secure one modular unit 20 to another to form a full-size ISO container. Connector 90 comprises a handle 91 having central flange 97 connected to axle 92 having obround elements 94 at either end. Axle 92 extends through and rotates in two further obround elements 96. Obround elements 94, 96 are sized to fit through the standard openings 100 in ISO fittings 102. The thickness of element 96 is such that when elements 94, 96 on one side of handle 91 are inserted into opening 100 as shown in FIG. 20B, then handle 91 and element 94 can be rotated 90 degrees, as shown in partial cross-section in FIG. 20E while element 96 remains held in opening 100. Handle 91 has secured to it an extension 104 which allows the user to rotate to handle 91 into a vertical position between the two units 20 and secure it by screw 106 to side 108. In this way two or more units are joined side by side to form a container of full ISO width, and similarly can be joined end to end to form a 40-foot container. In order to separate the units, screw 106 is removed and tool 110 used to pull end 112 of handle 91 from between units 20. Handle 91 is then rotated and units 20 can be separated and connector 90 removed.

Figure 22:
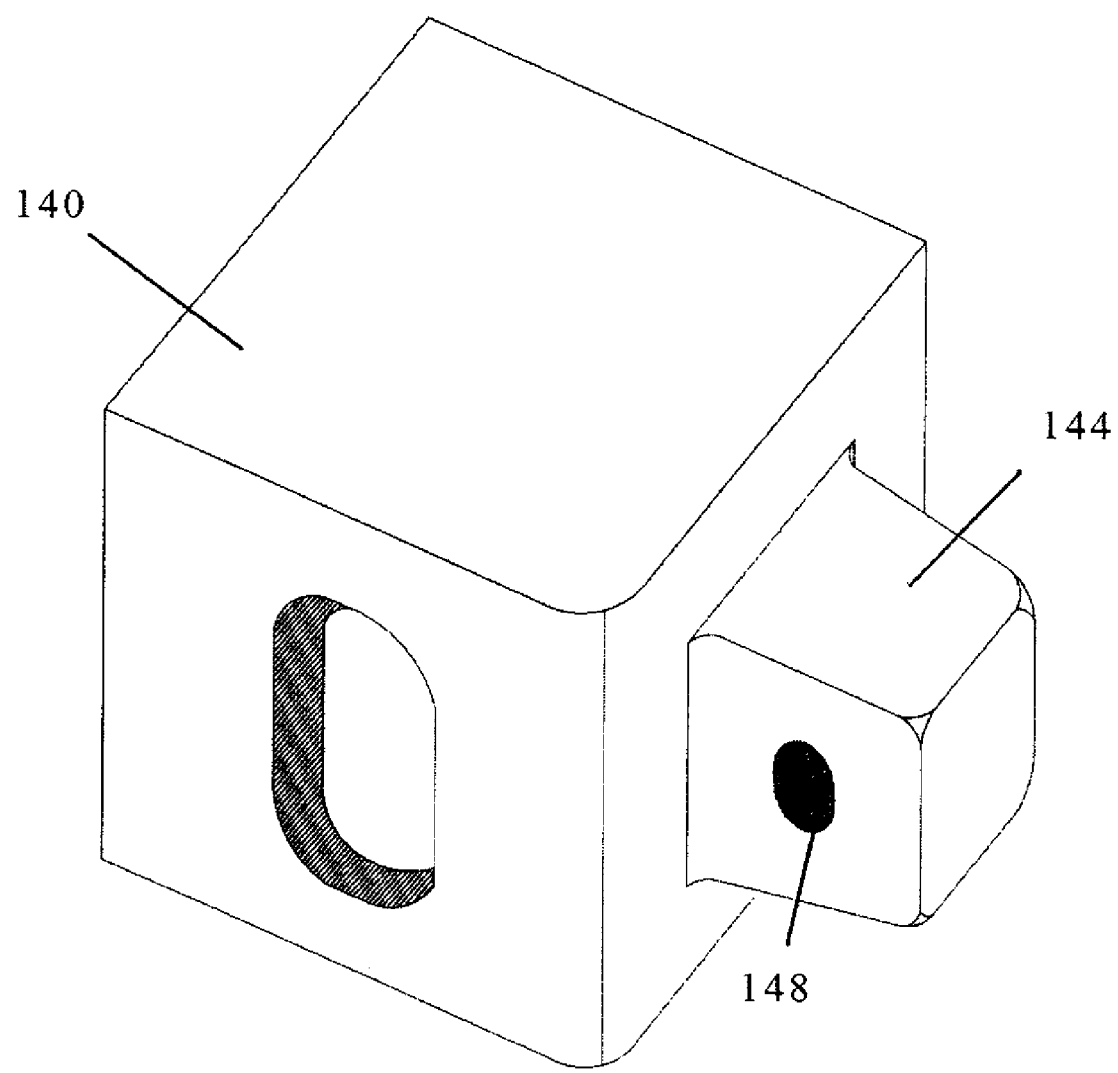
FIGS. 22 and 23 are isometric views of alternative corner castings for connecting adjacent units.
Figure 23:
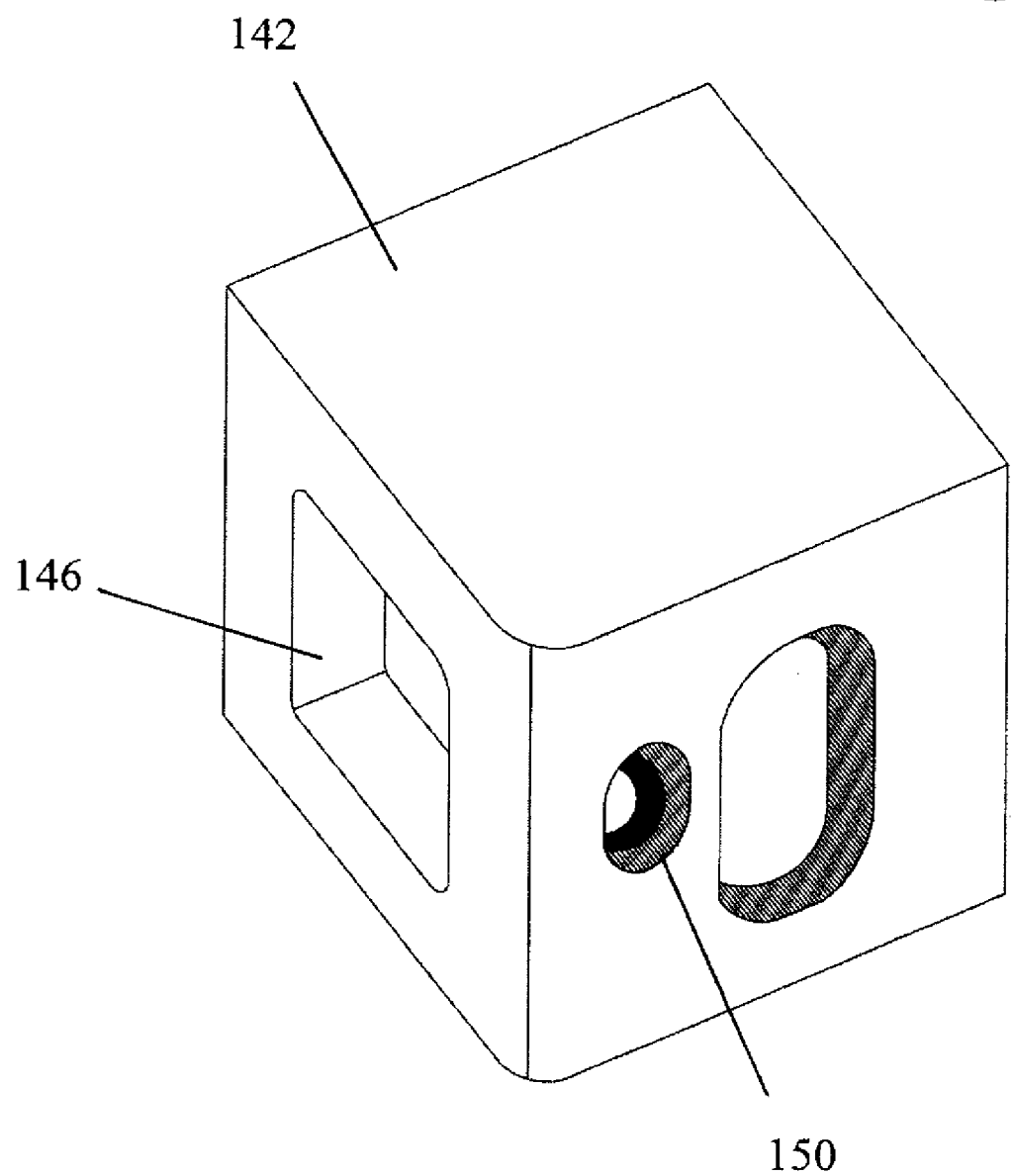

When a compound container of four modular units 20 is formed, two pairs of units 20 are connected side-by-side using the connectors 90 noted above and then the two connected pairs are joined end-to-end using connectors 90 on the adjoining outer corners. A second embodiment of a connector is illustrated in FIGS. 22 and 23. In this embodiment the modular unit 20 is provided with male and female corner castings 140, 142. The male corner casting 140 has a protrusion 144 which extends into aperture 146 of female corner casting 142. A pin, not shown, is then inserted with a friction fit through aperture 150 in female corner casting 142 and aperture 148 in male corner casting 140 to prevent protrusion 144 from withdrawing from aperture 146. So that a single configuration can be used for all modular units 20, preferably the male and female corner castings are provided on one side 22 only of the unit, with one male and one female corner at one end 26, and another male and female corner at the other end but with their positions reversed, so that one unit 20 is inverted to connect its male corners to the female corners of a second unit 20.

FIG. 21 illustrates a latching mechanism 122 which may be used to secure the adjacent wall, floor and roof sections. In the illustrated latch, recess 124 extends vertically in the interior surface of end wall 54 and secures end wall 54 to side wall 52. An elongated handle is pivotable vertically into and out of recess 124. It is attached to a pin 128 which is slidable in apertures 130, 132 and can slide into and out of aperture 134 in side wall 52. Apertures 130, 132, 134 are elongated, and pin 128 is provided with elongated flanges 136, 138 (shown 90 degrees out of actual position for purposes of illustration) so that when handle 126 is rotated to the position shown in FIG. 21, the pin 128 can be inserted into aperture 134 and when handle 126 is rotated back into recess 124 the flanges 136, 138 prevent pin 128 from being withdrawn from aperture 134. Preferably flange 138 has a cammed surface (not shown) so that when handle 126 is rotated back into recess 124 for latching, end wall 54 is drawn tightly against side wall 52 and gaskets 120 are tightened against and seal against side wall 52. Latches 122 are provided to join end wall 54 to roof 22 and floor 56 also.

One of the advantages of the foregoing embodiment is that windows in the end and side walls are protected in the interior of the modular unit in the collapsed configuration. Preferably crane 60 is telescopic so that it can be stored in modular unit 20 for shipping.

While the invention has been described using solid folding walls, the same inventive concept can be applied using a flexible covering over the extended floor portion, as shown in the MECC device disclosed in U.S. Pat. No. 5,761,854. The collapsible shelter in that case comprises a rigid container having opposed vertical sides, and a horizontal top and bottom, which when combined with one or more additional units form a container having the dimensions and characteristics which satisfy the standards for ISO shipping containers. In such embodiment at least one of the vertical sides of the modular unit comprises a pivoting wall portion hinged along the lower edge thereof to pivot between a closed vertical position and an open horizontal position. A flexible fabric cover is adapted to be extended above the pivoting wall portion while the pivoting wall portion is in the lowered horizontal position; and there is means for supporting the fabric cover above the hinged vertical side while the pivoting wall portion is in the lowered horizontal position. As in the embodiment described above, each modular unit is one-half (or a smaller fraction) of the standard ISO container width, and two or more modular units are connected as described above for shipping through ISO container channels.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

The invention claimed is:

1. A shelter-forming container unit, comprising:
   a rigid container that is expandable from a first collapsed configuration in which the rigid container includes opposed ends, opposed vertical sides, and a horizontal top and bottom, to a second expanded configuration in which the container forms a shelter including walls, a floor and a roof enclosing a living space,
   said opposed vertical sides each including a pivoting wall portion hingedly connected along one edge thereof to pivot between a closed vertical position and an open horizontal position;
   a latching mechanism configured to releasably secure said pivoting wall portions in said vertical position;
   a plurality of wall or roof portions releasably contained within said collapsed container that are configured to engage said pivoting wall portions in said horizontal position to form said walls, floor and roof enclosing a living space; and
   a connection mechanism configured to releasably connect said container unit when in said first collapsed configuration in side by side configuration to at least one other expandable shelter-forming container unit in collapsed configuration,
   wherein the rigid container forms, in the first collapsed state, a first fractional part of a single, longitudinally split 20 foot or 40 foot ISO rigid compound shipping container, whereby when the rigid container is connected to the at least one other expandable shelter-forming container unit, the first fractional part and the at least one other expandable shelter-forming container unit jointly form the whole, single, longitudinally split 20 foot or 40 foot ISO rigid compound shipping container.

2. The shelter-forming container unit of claim 1 wherein said rigid container comprises ISO corner castings and said connection mechanism comprises a connector adapted to releasably secure adjacent corner castings.

3. The shelter-forming container unit of claim 1 wherein said connection mechanism comprises male and female corner castings, said male corner casting comprising a protrusion removably insertable into an aperture of said female corner casting and a mechanism configured to releasably retain said protrusion in said aperture.

4. The shelter-forming container unit of claim 1 further comprising a support mechanism adapted to support said pivoting wall portions for releasably maintaining said pivoting wall portions in said horizontal position.

5. The shelter-forming container unit of claim 1 further comprising a hoisting mechanism configured to raise and lower said pivoting wall portions.

6. The shelter-forming container unit of claim 3 wherein said hoisting mechanism comprises a winch and a cable adapted to be releasably connected to said pivoting wall portions.

7. The shelter-forming container unit of claim 4 wherein said cable and winch are mounted on a freestanding elongated crane further comprising a pulley and a horizontal pole for removable attachment to an aperture in one side of said container unit.

8. The shelter-forming container unit of claim 1 wherein said pivoting wall portions each forms a roof of said living space in the expanded configuration and wherein said plurality of wall or roof portions comprise four end wall portions each hingedly connected to said container unit along a vertical edge thereof, two floor portions each hingedly connected to said container unit along one edge thereof and two side wall portions each hingedly connected to said floor portions along one edge thereof.

9. The shelter-forming container unit of claim 1 wherein said pivoting wall portions each forms a floor of said living space in the expanded configuration and wherein said plurality of wall or roof portions comprise four end wall portions each hingedly connected to said container unit along a vertical edge thereof, two roof portions each hingedly connected to said container unit along one edge thereof and two side wall portions each hingedly connected to said floor portions along one edge thereof.

10. The shelter-forming container unit of claim 1 wherein said pivoting wall portions each forms a floor of said living space in the expanded configuration and wherein said plurality of wall or roof portions comprise a flexible cover adapted to be extended above said pivoting wall portion while said pivoting wall portion is in said lowered horizontal position; and further comprising a mechanism configured to support said fabric cover above said pivoting wall portion while said pivoting wall portion is in said lowered horizontal position.

11. The shelter-forming container unit of claim 10 wherein said flexible cover is constructed from a fabric material.

12. The shelter-forming container unit of claim 1 wherein said latching mechanism comprises a threaded bolt.

13. The shelter-forming container unit of claim 1 wherein said latching mechanism comprises a latch.

14. The shelter-forming container unit of claim 1 wherein said connection mechanism comprises a connector having extensions for insertion into the corner castings of two adjacent container units which are adapted to be prevented from removal from said corner castings when rotated.

15. A compound shipping container comprising a plurality of shelter-forming container units according to claim 1, each said shelter-forming container unit being releasably connected to another shelter-forming container unit in side by side configuration to form a rigid compound shipping container.

16. The compound shipping container of claim 15 consisting of two shelter-forming container units according to claim 1 releasably secured in side-by-side configuration.

17. The compound shipping container of claim 15 consisting of four shelter-forming container units according to claim 1 releasably secured in a two-by-two array.

18. A method of constructing a shelter comprising walls, a floor and a roof enclosing a living space from a shelter-forming container unit as claimed in claim 1, expandable from a collapsed configuration forming a rigid container having opposed ends, opposed vertical sides, and a horizontal top and bottom, comprising:
   a) on a first side of said container unit raising a first pivoting roof portion hingedly connected along one edge thereof from a closed vertical position to an open horizontal position using a winch;
   b) lowering a floor portion hingedly connected to said container unit along one edge thereof and raising a vertical side wall portion hingedly connected to said floor portions along one edge thereof;
   c) pivoting horizontally outwardly end wall portions releasably contained within said collapsed container for engaging with said pivoting wall portions in said horizontal position to form said walls, floor and roof enclosing a living space; and d) releasably securing said end walls to said roof, side wall and floor portions; and e) repeating steps a) through d) on the second side of said container unit.

19. A compound shipping container comprising a plurality of shelter-forming container units according to claim 1, wherein at least two of the shelter-forming container units are connected together when in said collapsed configuration in side by side configuration to form the rigid compound shipping container, each of the shelter-forming container units when in the second expanded configuration having a floor area that is more than about five times the floor area of the shelter-forming container unit in the first collapsed configuration.

20. The compound shipping container of claim 19, wherein each of the shelter-forming container units is movable from the first collapsed configuration to the second expanded configuration when the shelter-forming container units are separated and spaced apart from one another.

21. A compound shipping container comprising a plurality of shelter-forming container units according to claim 1, wherein at least two of the shelter-forming container units are connected together when in said collapsed configuration in side by side configuration to form the rigid compound shipping container, the shelter-forming container units when in the second expanded configuration having a combined floor area that is more than about five times the floor area of the compound shipping container with the shelter-forming container units in the first collapsed configuration.

22. The compound shipping container of claim 17 consisting of two pairs of shelter-forming container units, wherein each said pair of shelter-forming container units is formed of two shelter-forming container units which are releasably secured in side-by-side configuration and wherein said two pairs of shelter-forming container units are releasably secured in end-to-end configuration.

23. The method of claim 18 wherein at least two of the shelter-forming container units are connected together when in said collapsed configuration in side by side configuration to form the rigid compound shipping container, comprising the further step of disconnecting said container units from said connection in side by side configuration prior to step a), and wherein each of said at least two of the shelter-forming container units when in the second expanded configuration has a floor area that is more than about five times the floor area of each of said at least two of the shelter-forming container units in the first collapsed configuration.

24. The method of claim 23 wherein said container units are disconnected from said connection in side by side configuration by removing a connector having extensions for insertion into the corner castings of two adjacent container units which are adapted to be prevented from removal from said corner castings when rotated in a first direction whereby said extensions are removed by rotating said extensions in the direction opposite to said first direction.

25. A shelter-forming container unit comprising:

a rigid container that is expandable from a first collapsed configuration in which the rigid container includes opposed ends, opposed vertical sides, and a horizontal top and bottom, to a second expanded configuration in which the container forms a shelter including walls, a floor and a roof enclosing a living space, the rigid container forming, in the first collapsed state, a first fractional part of a single, longitudinally split 20 foot or 40 foot ISO rigid compound shipping container, whereby when the rigid container is connected to at least one other expandable shelter-forming container unit, the first fractional part and the at least one other expandable shelter-forming container unit jointly form the whole, single, longitudinally split 20 foot or 40 foot ISO rigid compound shipping container.

26. The shelter-forming container unit of claim 25, wherein a shelter floor area of the floor of the shelter in the second expanded configuration corresponds to an external surface area of the opposed vertical sides and the horizontal bottom of the rigid container in the first collapsed position, and is about five times a container floor area of the shelter-forming container unit in the first collapsed configuration.

27. A compound shipping container comprising a plurality of shelter-forming container units according to claim 25, wherein at least two of the shelter-forming container units are connected together when in said collapsed configuration in side by side configuration to form the rigid compound shipping container, each of the shelter-forming container units having a shelter floor area of the floor of the shelter in the second expanded configuration that corresponds to an external surface area of the opposed vertical sides and the horizontal bottom of the rigid container in the first collapsed position, and that is about five times a container floor area of the shelter-forming container unit in the first collapsed configuration.

28. A compound shipping container comprising:

a plurality of shelter-forming container units connected together in side by side configuration to form a single, longitudinally split 20 foot or 40 foot ISO rigid compound shipping container, wherein each of the shelter-forming container units is expandable from a first collapsed configuration in which the shelter-forming container unit includes opposed ends, opposed vertical sides, and a horizontal top and bottom, to a second expanded configuration in which the shelter-forming container unit forms a shelter including walls, a floor and a roof enclosing a living space, and wherein a combined floor area of the plurality of shelter-forming container units in the second configuration is more than five times a floor area of a corresponding 20 foot or 40 foot ISO rigid compound shipping container.

\* \* \* \* \*